US012549660B2

(12) United States Patent
Hosoda

(10) Patent No.: US 12,549,660 B2
(45) Date of Patent: Feb. 10, 2026

(54) INFORMATION PROCESSING DEVICE, INFORMATION PROCESSING METHOD, AND INFORMATION PROCESSING SYSTEM FOR GENERATING FICTITIOUS EVENTS TO CHANGE DISTANCE BETWEEN USERS

(71) Applicant: SONY GROUP CORPORATION, Tokyo (JP)

(72) Inventor: Yasuhide Hosoda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 371 days.

(21) Appl. No.: 18/005,181

(22) PCT Filed: Jul. 7, 2021

(86) PCT No.: PCT/JP2021/025622
§ 371 (c)(1),
(2) Date: Jan. 11, 2023

(87) PCT Pub. No.: WO2022/019119
PCT Pub. Date: Jan. 27, 2022

(65) Prior Publication Data

US 2023/0188635 A1 Jun. 15, 2023

(30) Foreign Application Priority Data

Jul. 21, 2020 (JP) ................................ 2020-124531

(51) Int. Cl.
*H04M 1/72403* (2021.01)
*H04M 3/42* (2006.01)

(52) U.S. Cl.
CPC ......... *H04M 1/72403* (2021.01); *H04M 3/42* (2013.01)

(58) Field of Classification Search
CPC ........... H04M 3/4936; H04M 2242/18; H04M 3/42042; H04M 3/42093; H04M 3/493;
(Continued)

(56) References Cited

U.S. PATENT DOCUMENTS

2013/0245396 A1 9/2013 Berman et al.
2016/0205245 A1 * 7/2016 Kim ................... H04M 19/041 455/414.1

(Continued)

FOREIGN PATENT DOCUMENTS

JP 2015-050724 A 3/2015
JP 2019-158975 A 9/2019
NO 2013/099407 A1 7/2013

OTHER PUBLICATIONS

Hagiwara, et al., "Development and Evaluation of a "Gaze Phobic Komyusho" Support System using See-through HMD based on Social Welfare Approach", Japan Society for Software Science and Technology, Computer Software, vol. 33, No. 1, Feb. 2016, pp. 52-62.

(Continued)

*Primary Examiner* — Golam Sorowar
(74) *Attorney, Agent, or Firm* — CHIP LAW GROUP

(57) ABSTRACT

The present technology relates to an information processing device, an information processing method, a program, and an information processing system that make it possible to keep other people at an appropriate distance. An information processing device according to one aspect of the present technology generates an event, which is a fictitious event, to change a distance between a user and another party the user has encountered in accordance with context of the user, and presents the event to the user. The present technology is applicable to, for example, a server on the Internet, the server providing a service for generating events.

17 Claims, 31 Drawing Sheets

(58) Field of Classification Search
CPC .......... H04M 3/58; H04M 3/60; H04M 11/00; H04M 1/72433; G06N 20/00; G06N 3/08; G06N 3/045; G06N 3/084; G06N 5/022; G06N 3/04; G06N 3/044; G06N 3/047; G06N 3/048; G06F 40/205; G06F 40/56; G06F 3/011; G06F 3/013; G06F 3/167; G06F 3/017; G06F 9/453; G06F 16/9536; G06F 40/30; H04L 67/306; H04L 51/214; H04L 51/02; H04L 67/75; H04L 51/18; H04L 51/212; H04L 51/222; H04L 51/224; H04L 51/52; H04L 67/12
See application file for complete search history.

(56) References Cited

U.S. PATENT DOCUMENTS

| | | | | |
|---|---|---|---|---|
| 2018/0188818 | A1* | 7/2018 | Tanaka | H04Q 9/00 |
| 2019/0294807 | A1* | 9/2019 | Takano | G06F 21/62 |
| 2020/0027171 | A1* | 1/2020 | Oren | G06Q 50/01 |
| 2020/0322214 | A1* | 10/2020 | Yuan | H04L 47/83 |
| 2020/0349829 | A1* | 11/2020 | Larsen | H04N 7/188 |
| 2020/0372779 | A1* | 11/2020 | Moriya | G08B 21/0476 |
| 2021/0193172 | A1* | 6/2021 | Shionozaki | G06V 40/174 |

OTHER PUBLICATIONS

International Search Report and Written Opinion of PCT Application No. PCT/JP2021/025622, issued on Oct. 5, 2021, 09 pages of ISRWO.

* cited by examiner

AVOIDANCE ACTION

| MALE | FEMALE |
|---|---|
| L1 L2 L3 | L1 L2 L3 |
| OFFICE | SCHOOL |
| L1 L2 L3 | L1 L2 L3 |
| WORK | FUN |
| L1 L2 L3 | L1 L2 L3 |
| FRIEND | OTHERS |
| L1 L2 L3 | L1 L2 L3 |

FIG. 7

| | BEFORE/AFTER CONTACT WITH OTHER PARTY | DETAILS OF DESIRE |
|---|---|---|
| DESIRED AVOIDANCE LEVEL 1 | BEFORE CONTACT WITH OTHER PARTY | DESIRE TO AVOID IMMEDIATELY |
| DESIRED AVOIDANCE LEVEL 2 | AFTER CONTACT WITH OTHER PARTY | DESIRE TO AVOID BY ALL MEANS |
| DESIRED AVOIDANCE LEVEL 3 | AFTER CONTACT WITH OTHER PARTY | DESIRE TO AVOID IF POSSIBLE |

FIG. 16
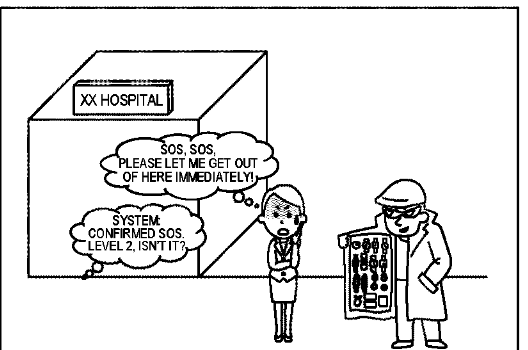
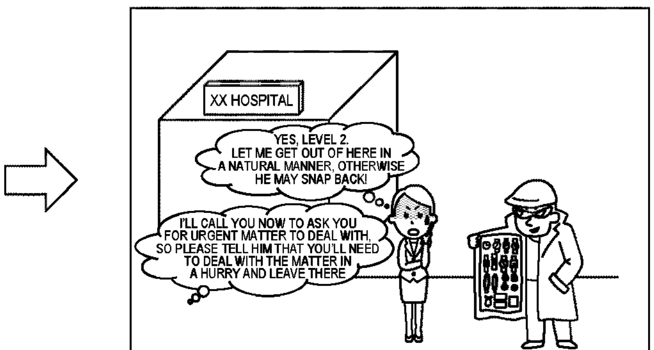

FIG. 17
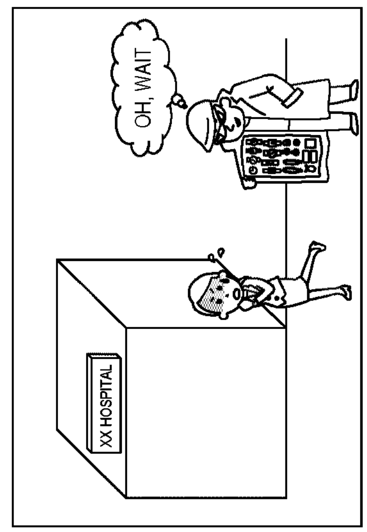
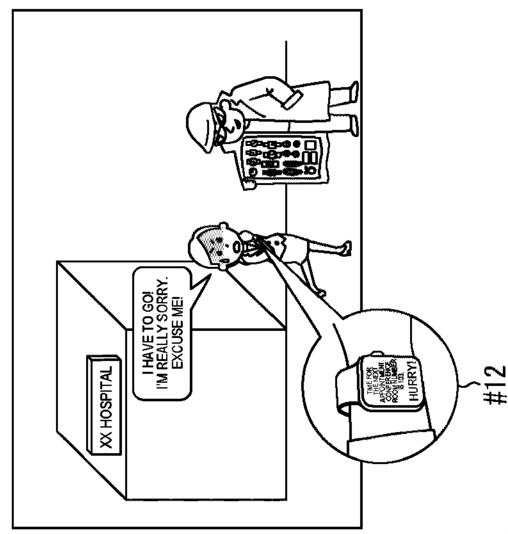

FIG. 19
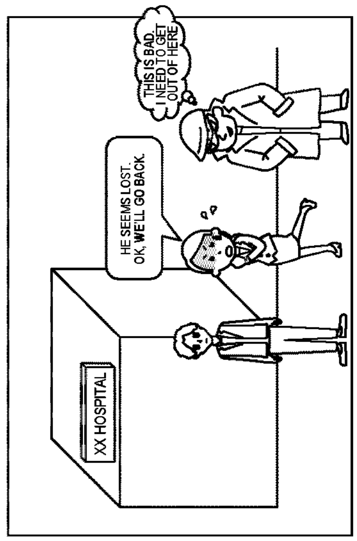
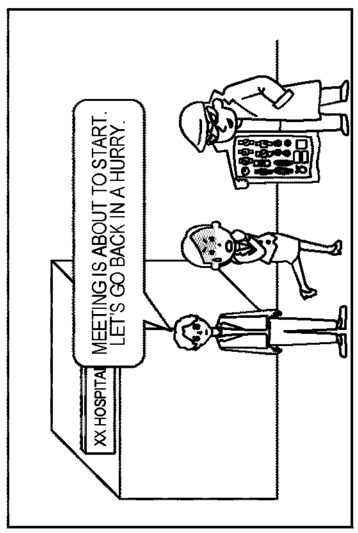

*FIG. 20*

NOTIFICATION ABOUT AVOIDANCE ACTION

DETAILS OF EVENT
"BATHROOM"

FIG. 27

| | |
|---|---|
| A TYPE (WORK FIRST TYPE) | AVOIDANCE ACTION WITH SUPERIOR'S MOOD AND CONVENIENCE TAKEN INTO CONSIDERATION WITHOUT DESTROYING ATMOSPHERE |
| B TYPE (SELF-CENTEREDNESS TYPE) | AVOIDANCE ACTION OF ATTAINING AVOIDANCE BY ALL MEANS REGARDLESS OF WHETHER IT GIVES BAD EXPRESSION |
| C TYPE (BALANCE TYPE) | AVOIDANCE ACTION THAT MAKES GOOD USE OF RELATIONSHIP WITH OTHER PARTY WHILE REPLYING EVASIVELY |

201
CLIENT TERMINAL
212
SENSOR UNIT
231
CAMERA
232
MICROPHONE
233
POSITIONING SENSOR
234
BIOLOGICAL SENSOR
211
CONTROLLER
221
SENSOR DATA TRANSMITTER
222
EVENT PRESENTATION UNIT
213
STORAGE UNIT
214
OPERATION UNIT
215
COMMUNICATION UNIT
216
OUTPUT UNIT
241
DISPLAY
242
SPEAKER

INFORMATION PROCESSING DEVICE, INFORMATION PROCESSING METHOD, AND INFORMATION PROCESSING SYSTEM FOR GENERATING FICTITIOUS EVENTS TO CHANGE DISTANCE BETWEEN USERS

CROSS REFERENCE TO RELATED APPLICATIONS

This application is a U.S. National Phase of International Patent Application No. PCT/JP2021/025622 filed on Jul. 7, 2021, which claims priority benefit of Japanese Patent Application No. JP 2020-124531 filed in the Japan Patent Office on Jul. 21, 2020. Each of the above-referenced applications is hereby incorporated herein by reference in its entirety.

TECHNICAL FIELD

The present technology particularly relates to an information processing device, an information processing method, a program, and an information processing system that make it possible to keep other people at an appropriate distance.

BACKGROUND ART

Many people wish to "live calmly".

Nevertheless, for example, there is a case where when a person is caught up in a trouble in a train, and then the person is baselessly slandered by a stranger. Furthermore, there is another case where a person encounters his/her superior only when the person does not want to meet his/her superior such as after making a mistake at work.

In order to live calmly without feeling bothered, the distance to the other party is important regardless of whether the other party is an acquaintance or a stranger.

As an application of a smartphone, there is an application that generates a false incoming call. The user can use the application to, for example, generate a false incoming call when his/her superior points out his/her mistake at work and pretend to respond to the false incoming call to get out of the situation.

Patent Document 1 discloses an agent system that makes the atmosphere of a place better by evaluating the atmosphere of the place during driving on the basis of, for example, feelings two occupants have and causing a character to speak when the atmosphere is bad.

CITATION LIST

Patent Document

Patent Document 1: Japanese Patent Application Laid-Open No. 2019-158975

SUMMARY OF THE INVENTION

Problems to be Solved by the Invention

A repetition of a similar incoming call raises suspicion, so that the user cannot use the application as described above to get out of the situation many times. Furthermore, the user needs to perform an operation for originating an incoming call.

On the other hand, in the agent system disclosed in Patent Document 1, if the occupants know that the utterance of the character is given to change the atmosphere of the place, the reaction of the occupants to the utterance of the character becomes calm, and the effect may be reduced.

The present technology has been made in view of such circumstances, and it is therefore an object of present technology to keep the other people at an appropriate distance.

Solutions to Problems

An information processing device according to one aspect of the present technology includes an information processor configured to generate an event, which is a fictitious event, to change a distance between a user and another party the user has encountered in accordance with context of the user and present the event to the user.

In the one aspect of the present technology, an event, which is a fictitious event, is generated to change a distance between a user and another party the user has encountered in accordance with context of the user and is presented to the user.

BRIEF DESCRIPTION OF DRAWINGS

FIG. 7 is a diagram illustrating examples of a desired avoidance level.

FIG. 16 is a diagram illustrating conversations between the user and the other party.

FIG. 17 is a diagram illustrating an example of how to present an event.

FIG. 19 is a diagram illustrating how the cooperator calls.

FIG. 20 is a diagram illustrating an example of notification.

FIG. 27 is a diagram illustrating examples of a value type.

MODE FOR CARRYING OUT THE INVENTION

Figure 1:
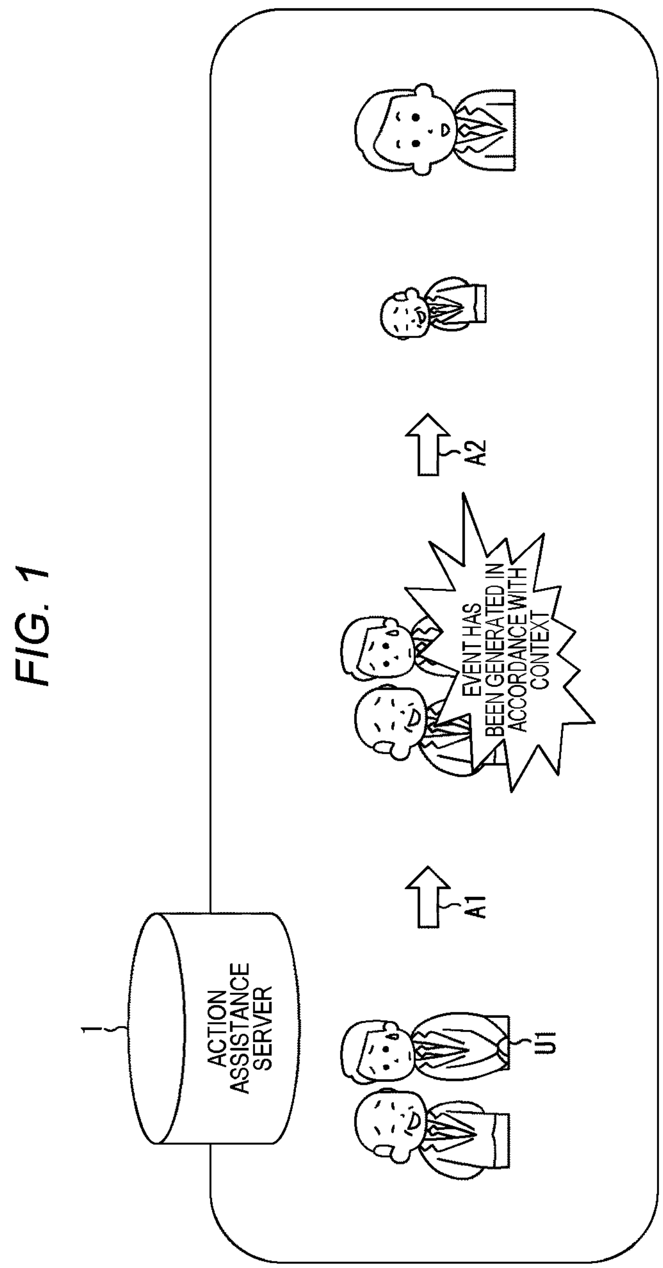
FIG. 1 is a diagram illustrating an example of assistance given by an action assistance system.

Hereinafter, modes for carrying out the present technology will be described. Note that the description will be given in the following order.

1. Action assistance system
2. Operation of action assistance server
3. Case where the other party is a stranger
4. Case where the other party is an acquaintance
5. Determination of avoidance action with user's values taken into account
6. Configuration of each device
7. Modification <<Action Assistance System>>

<Assistance Given by Action Assistance System>

FIG. 1 is a diagram illustrating an example of assistance given by an action assistance system according to an embodiment of the present technology.

The action assistance system according to the embodiment of the present technology is implemented by an action assistance server 1 that is a server on the Internet.

In a case where a user U1 feels bothered by a relationship with a person the user U1 has encountered, the action assistance server 1 assists the user U1 in selecting an action that keeps the other party at an appropriate distance from the user U1. Examples of the person the user U1 has encountered include not only those already in contact with the user U1 but also those who may come into contact with the user U1. For example, as illustrated on the left side of FIG. 1, a state where the user U1 has verbal communication with the other party is a contact state.

The action assistance server 1 generates an event in accordance with context to assist the user U1 in selecting an action that keeps the other party at an appropriate distance from the user U1, as indicated by an arrow A1 in FIG. 1.

In the example illustrated in FIG. 1, the user U1 selects his/her own action in response to the event generated in accordance with the context, so as to successfully move away from the other party as indicated by an arrow A2. The event generated by the action assistance server 1 is an event that may change the distance to the other party.

As described above, the action assistance system is a system that creates, by generating an event, a situation in which the user can avoid the other party. The user can avoid the other party, that is, botheration, by taking an action in response to the generation of the event.

Note that each user of the action assistance system has a device such as a smartphone, inner ear headphones (earphones), a glasses-type head mounted display (HMD), or a wristwatch-type wearable device (smartwatch) as a client terminal.

Each client terminal is connected to the Internet directly or via another device so as to communicate with the action assistance server 1. The action assistance server 1 detects the context of each user on the basis of information transmitted from the client terminal, and generates an event in accordance with the context thus detected.

Figure 2:
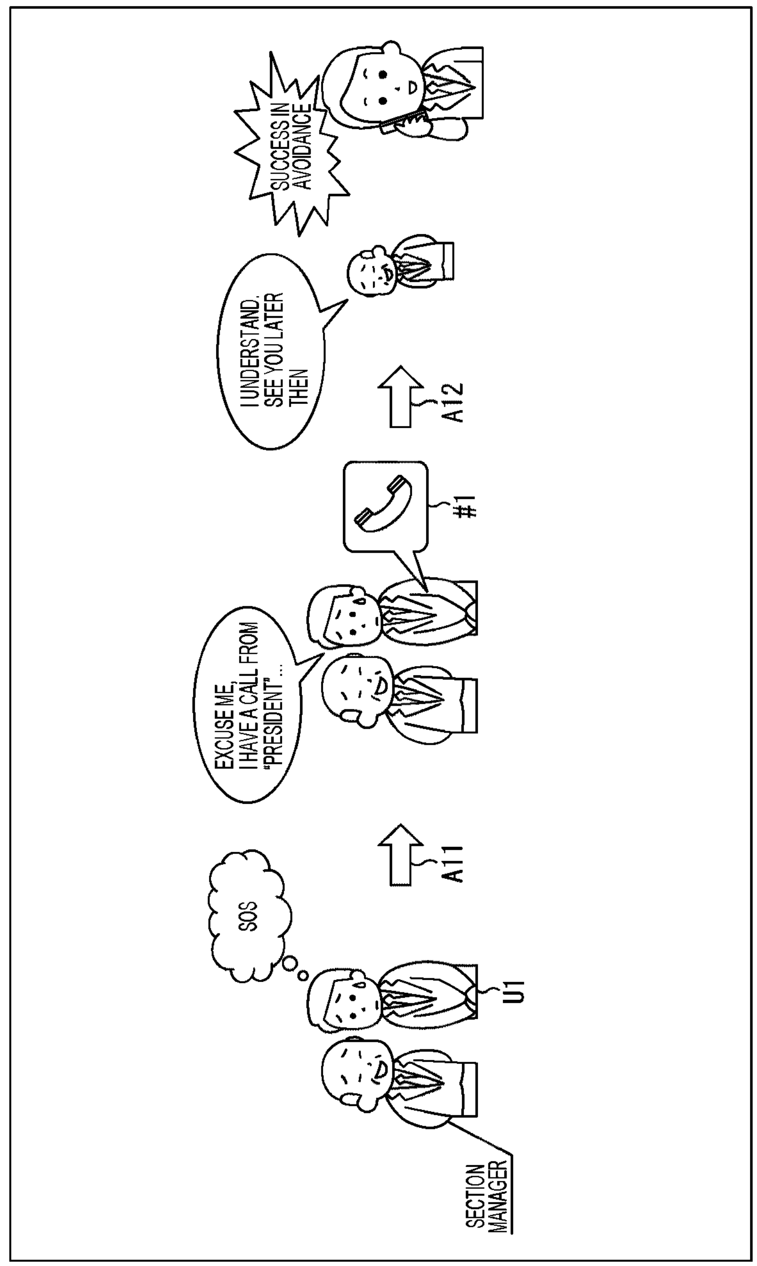
FIG. 2 is a diagram illustrating how a user attains avoidance.

FIG. 2 is a diagram illustrating how the user attains avoidance.

As illustrated on the left side of FIG. 2, it is assumed that a situation in which a section manager who is a superior of the user U1 is talking to the user U1 is detected by the action assistance server 1 as the context of the user U1. What the section manager is talking about is a lecture on a mistake at work made by the user U1. The user U1 needs to continue to be given the lecture because the other party is his/her superior.

In such a situation, in a case where the user U1 makes a request to avoid the other party, a fictitious event is raised by the action assistance server 1 as indicated by an arrow A11.

In the example illustrated in FIG. 2, as shown in a balloon #1, an event of making a call to a smartphone held by the user U1 is raised. Furthermore, it is assumed that the incoming call is from the president. A ring tone is output from a speaker of the smartphone held by the user U1, and a notification of the incoming call from the president appears on a display.

Since the president is not actually calling the user U1, the incoming call from the president is a fictitious event. The event corresponding to the incoming call from the president is presented to the user U1 and the section manager via a ring tone or display on the display.

The user U1 takes out the smartphone, looks at the display on the display, and tells the section manager that I have a call from the president. The user U1 can avoid the lecture given by the section manager by selecting an action of responding to the call from the president as indicated by an arrow A12.

As described above, the action assistance server 1 creates a situation in which the user U1 can avoid the other party who makes the user U1 feel bothered in a natural manner rather than in a forcible manner. Furthermore, as an event for creating such a situation, an appropriate event is selected and presented by the action assistance server 1 in accordance with the context.

In the example illustrated in FIG. 2, from the viewpoint of the section manager, the president who is the caller is his/her superior. The section manager can understand that the user U1 gives priority to responding to the incoming call from the president over listening to his/her lecture.

In a case where an event that the section manager cannot understand is generated to cause the user to avoid the current situation in a forcible manner, the section manager will remain dissatisfied. Generating an event that gives a sense of satisfaction and presenting details of the event to the user U1 and the section manager makes it possible to prevent the section manager from remaining dissatisfied. The user U1 can also select an action of avoiding without feelings of guiltiness.

In particular, in a case where the other party is an acquaintance such as his/her superior, it is necessary to consider the future relationship between the two, so that it can be said that it is important to allow the user to attain avoidance in a manner that makes the other party feel satisfied.

Figure 3:
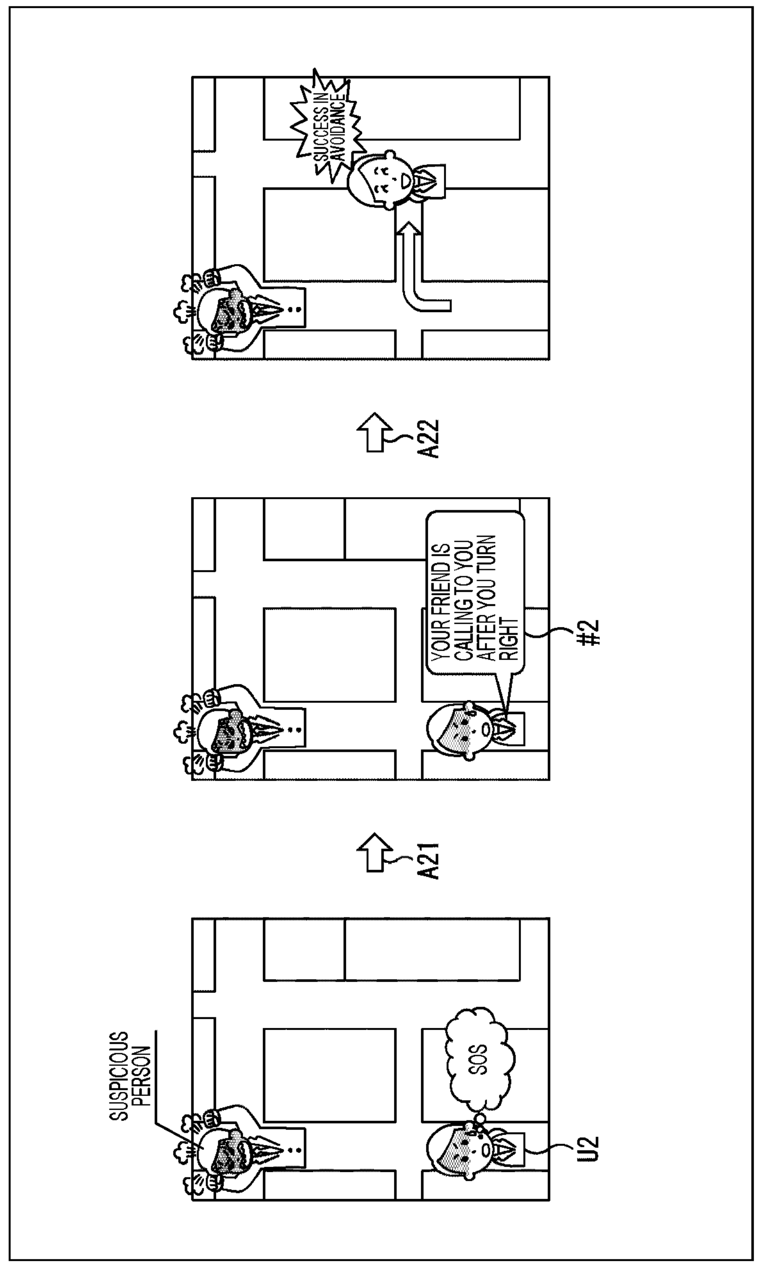
FIG. 3 is another diagram illustrating how the user attains avoidance.

FIG. 3 is another diagram illustrating how the user attains avoidance.

As illustrated on the left side of FIG. 3, it is assumed that a situation in which while a user U2 is walking in town, a suspicious person is approaching from the front of the user U2 is detected by the action assistance server 1 as context of the user U2. In a case where the user U2 keeps going straight along the street, the user U2 may get entangled with the suspicious person.

In such a situation, in a case where the user U2 makes a request to avoid the other party, a fictitious event is raised by the action assistance server 1 as indicated by an arrow A21.

In the example illustrated in FIG. 3, as shown in a balloon #2, a situation in which after the user U2 turns right at the next corner (T-junction), his/her friend is calling to the user U2 is raised as an event, and the user U2 is notified of the event. The notification that the friend is calling is made by voice from a speaker of a smartphone held by the user U2.

Since no friend is actually present at the place after turning right, the situation in which the friend is calling is a fictitious event.

The user U2 listens to the notification from the action assistance server 1 and selects an action of turning right while pretending to look for his/her friend, so that the user U2 can avoid the suspicious person as indicated by an arrow A22.

In a case where the user U2 suddenly turns right at the corner, the user U2 may give, to the suspicious person, an impression that the user U2 has avoided the suspicious person and drives the suspicious person to frenzy. The action assistance server 1 notifies the user U2 that his/her friend is present so as to cause the user U2 to show a behavior as if the user U2 is looking for the friend to surrounding people including at least the other party, thereby making it possible to guide the user U2 in such a manner as to prevent the surrounding people including the suspicious person from feeling strange.

As described above, the action assistance system is a system that allows the user to select an action of avoiding a cause of botheration and keep the other party at an appropriate distance, thereby allowing the user to live calmly.

Since the other party is not dissatisfied with the user who has avoided the other party, it can also be said that the action assistance system is a system that allows the other party the user has encountered to live calmly.

<How to Share Avoidance Action>

Figure 4:
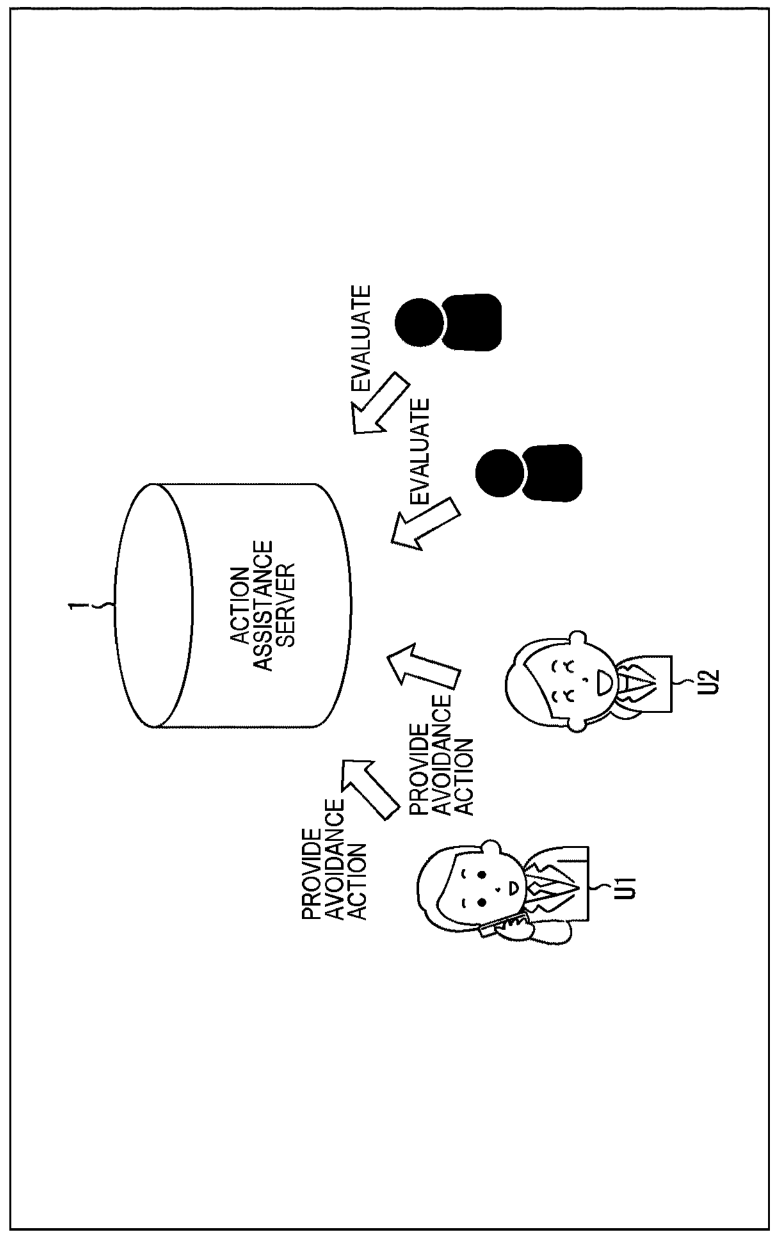
FIG. 4 is a diagram illustrating an example of how to share avoidance actions.

FIG. 4 is a diagram illustrating an example of how to share avoidance actions.

Each user of the action assistance system uploads avoidance information that is information regarding an avoidance action to the action assistance server 1 to share the avoidance information with other users.

The avoidance information is information in which a situation experienced by each user is associated with an avoidance action taken in the situation. The avoidance information further contains information indicating whether avoidance of the other party succeeded or failed.

Figures 5A, 5B:
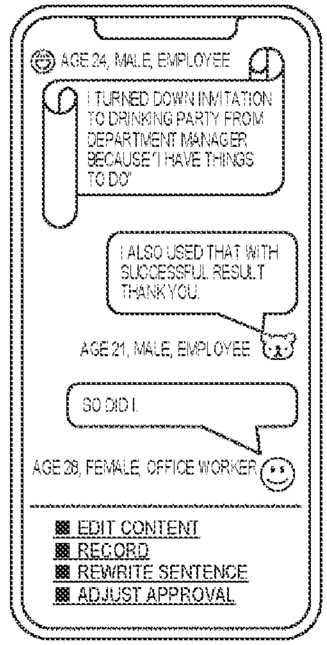
FIGS. 5A and 5B are diagrams illustrating an example of a shared screen showing an avoidance action.

For example, each user operates his/her client terminal to access the action assistance server 1 so as to know, as illustrated in FIG. 5A, in what situation, what kind of avoidance action is taken by another user. In the example illustrated in FIG. 5A, information regarding an avoidance action taken by another user appears on the display of the smartphone held by a certain user.

An avoidance action for each situation may be searched for using a search screen illustrated in FIG. 5B. In the search screen illustrated in FIG. 5B, tapping on each section makes it is possible to select a corresponding situation such as a case where the other party is a male or a case where the place is an office.

Selecting a predetermined situation causes information regarding an avoidance action taken in accordance with the situation thus selected to appear. The user can know a corresponding avoidance action taken in accordance with each situation.

The avoidance information provided from each user is also used for learning of an avoidance action. In the action assistance server 1, when machine learning is performed using the avoidance information provided by each user, an avoidance action determination model is created. The avoidance action determination model will be described later.

Each user may be able to evaluate avoidance actions taken by the other users. It is possible to impart a gaming property to avoidance of the other party who causes botheration by calculating a score of the avoidance taken by each user in accordance with the evaluation.

<How to Determine Avoidance Action>

Figure 6:
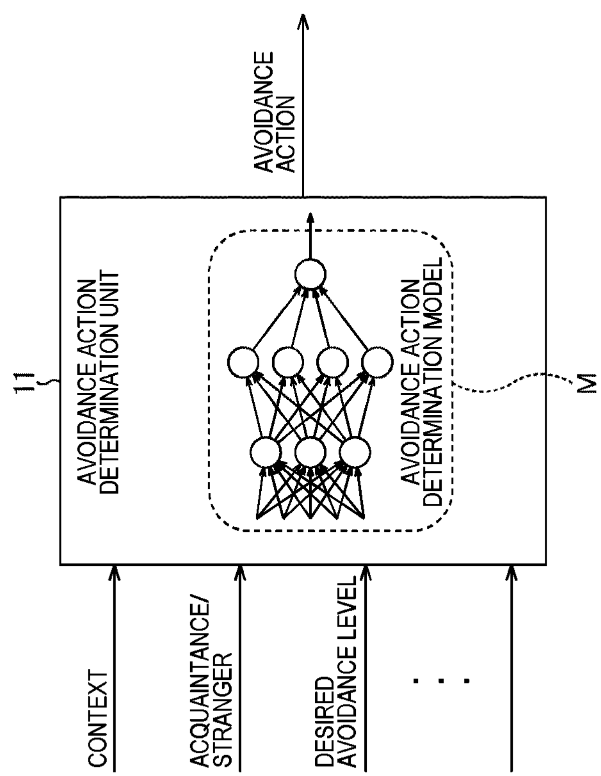
FIG. 6 is a diagram illustrating an example of how to determine an avoidance action.

FIG. 6 is a diagram illustrating an example of how to determine an avoidance action.

As illustrated in FIG. 6, an avoidance action determination unit 11 having an avoidance action determination model M is provided in the action assistance server 1. The avoidance action determination model M is an inference model configured by a neural network created through machine learning using the avoidance information or the like.

Information indicating whether the other party is an acquaintance or a stranger and information indicating a desired avoidance level are supplied to the avoidance action determination unit 11 together with the information indicating the context of the user. When such pieces of information are input into the avoidance action determination model M, information indicating an avoidance action is output.

Note that the context includes an external situation such as an occurrence around the user. The external situation includes an action taken by the user, an environment around the user including an action taken by a nearby person, and who is a person with which the user is in contact or a person with which the user is likely to come into contact, or the like. Whether the other party is an acquaintance or a stranger may be included in the context.

Furthermore, the context includes an internal situation such as a user's feeling or a user's biological reaction. The internal situation includes a feeling a person with which the user is in contact has, a feeling a person with which the user is likely to come into contact has, or the like.

As described above, the avoidance action determined in the action assistance server 1 differs between a case where the other party is an acquaintance and a case where the other party is a stranger.

In a case where the other party is an acquaintance, as described above, an avoidance action is determined with the future relationship with the other party taken into consideration. On the other hand, in a case where the other party is a stranger, an avoidance action is determined with no future relationship with the other party taken into consideration.

Furthermore, the avoidance action determined in the action assistance server 1 differs in a manner that depends on the desired avoidance level. The desired avoidance level indicates a degree of the user's desire to avoid the other party by changing the distance to the other party.

FIG. 7 is a diagram illustrating examples of the desired avoidance level.

Three levels, a desired avoidance level 1, a desired avoidance level 2, and a desired avoidance level 3, are prepared as the desired avoidance level.

The desired avoidance level 1 is a level that is applied before contact with the other party. The situation the user U2 has encountered described with reference to FIG. 3 is a situation before contact with the suspicious person who is the other party.

The desired avoidance level 1 indicates that the user desires to move away immediately (avoid immediately).

On the other hand, the desired avoidance levels 2, 3 are levels that are each applied after contact with the other party. The situation the user U1 has encountered described with reference to FIG. 2 is a situation after contact with the section manager who is the other party.

The desired avoidance level 2 indicates that the user desires to move way, by all means, from the other party with which the user is in contact (strongly desires to avoid). For example, an avoidance action at the desired avoidance level 2 is applied to a case where the atmosphere becomes uncomfortable while the other party is talking to the user, and the user wants to avoid the other party.

The desired avoidance level 3 indicates that the user desires to move away, if possible, from the other party with which the user is in contact (weakly desires to avoid). For example, an avoidance action at the desired avoidance level 3 is applied to a case where the user wants to attain avoidance in a natural manner rather than in an explicit manner.

Such a desired avoidance level is designated by the user, for example. The desired avoidance level may be automatically determined by the action assistance server 1 in accordance with the context or the like.

As described above, in the action assistance server 1, the avoidance action whose details differ in a manner that depends on the desired avoidance level indicating the degree of the user's desire to avoid the other party is determined.

<<Operation of Action Assistance Server>>

Here, a basic operation of the action assistance server 1 that assists in selecting an action of avoiding the other party will be described with reference to the flowchart illustrated in FIG. 8. It is assumed that the user lives with the user holding or wearing the client terminal.

In step S1, the action assistance server 1 acquires sensor data transmitted from the client terminal.

The sensor data detected by a sensor provided in the client terminal is repeatedly transmitted from the client terminal held by the user. For example, various types of sensor data such as an image of the surroundings of the user captured by a camera, voice data on the voice of the user detected and obtained by a microphone, and biological data on the biological reaction of the user detected and obtained by a biological sensor are acquired.

The sensor data may be detected and transmitted by a sensor located near the user (client terminal) rather than by the sensor provided in the client terminal.

In step S2, the action assistance server 1 analyzes the sensor data to detect context. As described above, the context includes the external situation and the internal situation. The external situation is identified, for example, by analyzing the image showing the surroundings of the user or analyzing the voice. Furthermore, the internal situation is identified by analyzing the biological reaction of the user or the details of the utterance from the user or estimating the user's feeling from the expression of the user appearing in the image.

In step S3, the action assistance server 1 determines whether or not an occurrence serving as an event trigger that a trigger for generating an event has happened on the basis of the context.

Examples of the occurrence serving as the event trigger include an occurrence in which the user makes an avoidance request that is a request to avoid the other party. The avoidance request is made, for example, by the user uttering a specific word such as "SOS" or, "That's not good". Furthermore, the avoidance request is also made in response to predetermined operation such as pressing a button on the screen of the client terminal.

Detection of preset context such as the suspicious person being present near the user or the biological reaction of the user being abnormal may be determined to be the occurrence serving as the event trigger. In this case, an event is automatically raised regardless of the avoidance request.

In a case where it is determined in step S3 that the occurrence serving as the event trigger has happened, the action assistance server 1 inquires of the user as to which desired avoidance level is applied in step S4. The desired avoidance level may be automatically determined in response to the occurrence serving as the event trigger without inquiring of the user about the desired avoidance level.

In step S5, the action assistance server 1 determines an avoidance action in accordance with the context using the avoidance action determination model M or the like.

In step S6, the action assistance server 1 generates an event in accordance with the avoidance action thus determined. The generation of the event is performed in cooperation between the action assistance server 1 and the client terminal. The client terminal presents the event raised by the action assistance server 1 to the user under the control of the action assistance server 1. The client terminal presents the event not only to the user but also to a person around the user including at least the other party as needed.

Note that, depending on an event, the action assistance server 1 and a device installed near the user or a device held by a person near the user raise an event in cooperation.

After the generation of the event in step S6, or in a case where it is determined in step S3 that no occurrence serving as the event trigger has happened, the processing returns to step S1 and is repeated.

A specific example of avoidance attained by the above-described processing will be described.

<<Case where the Other Party is a Stranger>>

<Desired Avoidance Level 1>

Figure 9:
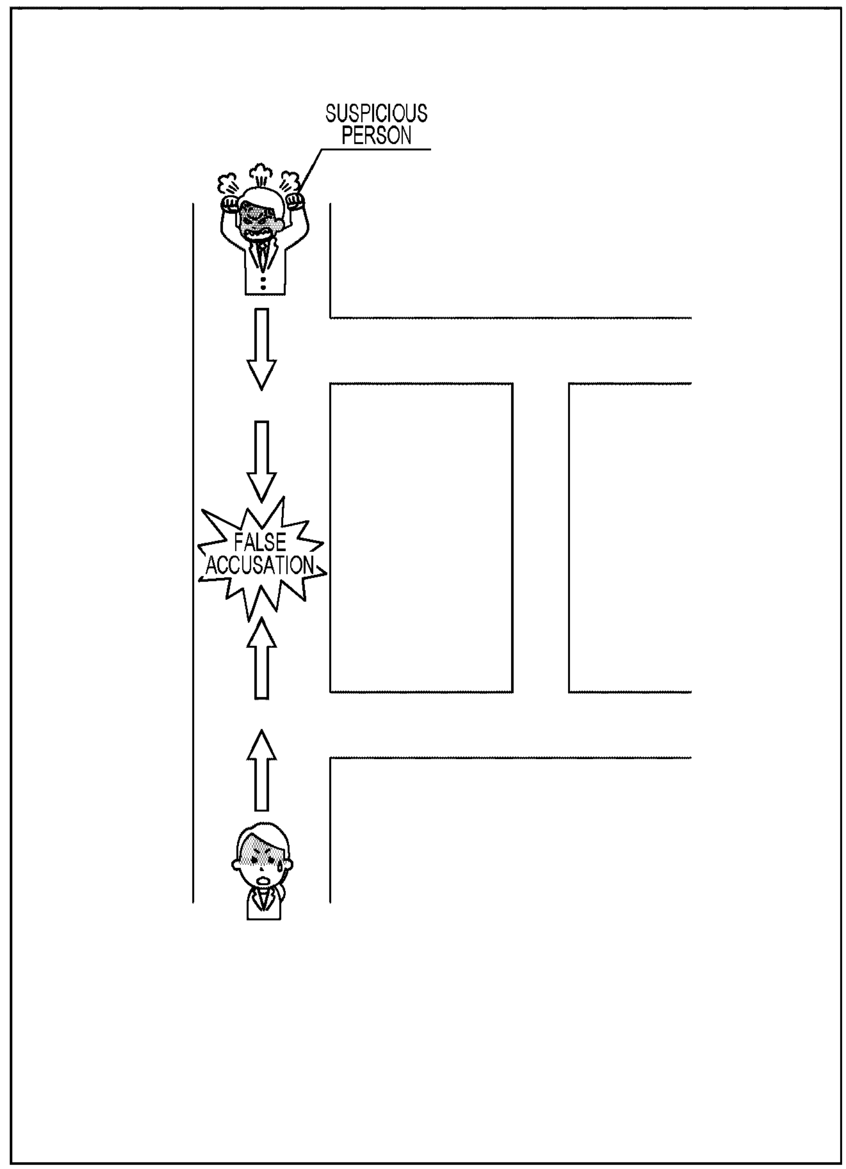
FIG. 9 is a diagram illustrating an example of a situation the user has encountered.

FIG. 9 is a diagram illustrating an example of a situation the user has encountered.

As illustrated in FIG. 9, a situation is assumed in which while the user is walking in town, a suspicious person is approaching from the front of the user. In a case where the user keeps going straight along the street, the user gets close to the suspicious person and may get entangled with, for example, falsely accused by, the suspicious person. The suspicious person present ahead of the user is the other party who has not yet come in contact with the user but is predicted to come in contact with the user. There is a corner located ahead of the user so that the user can detour around the street along which the user is currently walking.

Example of Voice Navigation

Figure 10:
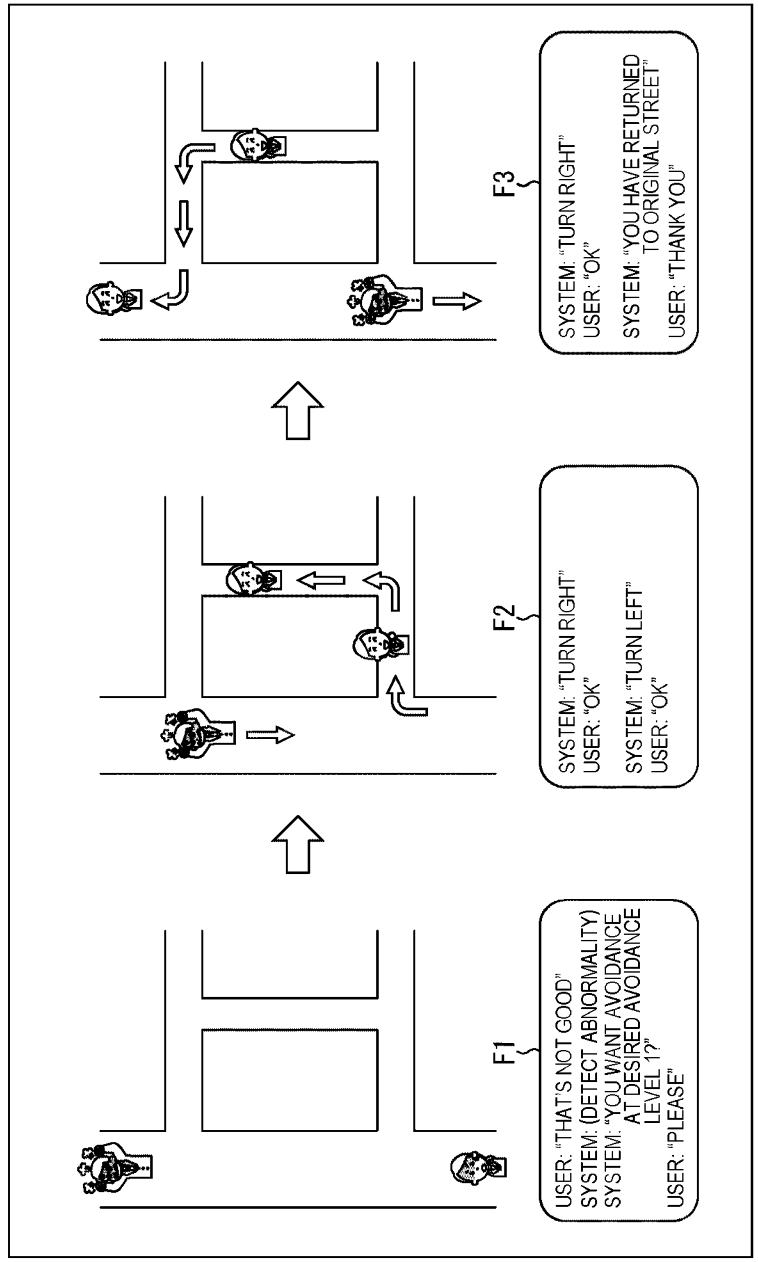
FIG. 10 is a diagram illustrating an example of avoidance using voice navigation.

FIG. 10 is a diagram illustrating an example of avoidance using voice navigation.

As illustrated in a frame F1 on the left side of FIG. 10, in a case where the action assistance server 1 detects an abnormality in response to the utterance, from the user who has noticed the suspicious person, a word such as "That's not good" serving as the avoidance request, an inquiry as to whether or not to request avoidance at the desired avoidance level 1 is made to the user.

For example, it is assumed that the user has a smartphone as the client terminal. The voice under the control of the action assistance server 1 is output from the speaker of the smartphone, and the voice of the user is detected by the microphone of the smartphone.

In FIG. 10, a string "system" denotes the action assistance system. The details of the utterance shown next to the string "system" is a voice output from the smartphone on the basis of the control of the action assistance server 1.

The utterance of a word such as "please" in response to the inquiry from the action assistance server 1 designates the desired avoidance level.

The action assistance server 1 performs control for outputting a navigation voice for making a detour. In the example illustrated in the center of FIG. 10, as illustrated in a frame F2, turning right at a corner and then turning left at the next corner is presented. Thereafter, as illustrated in a frame F3 on the right side of FIG. 10, a navigation voice for returning to the original street is output.

The avoidance of the other party may be attained by simply showing the user the way as described above rather than by a fictitious event.

Example Using Voice AR

Figure 11:
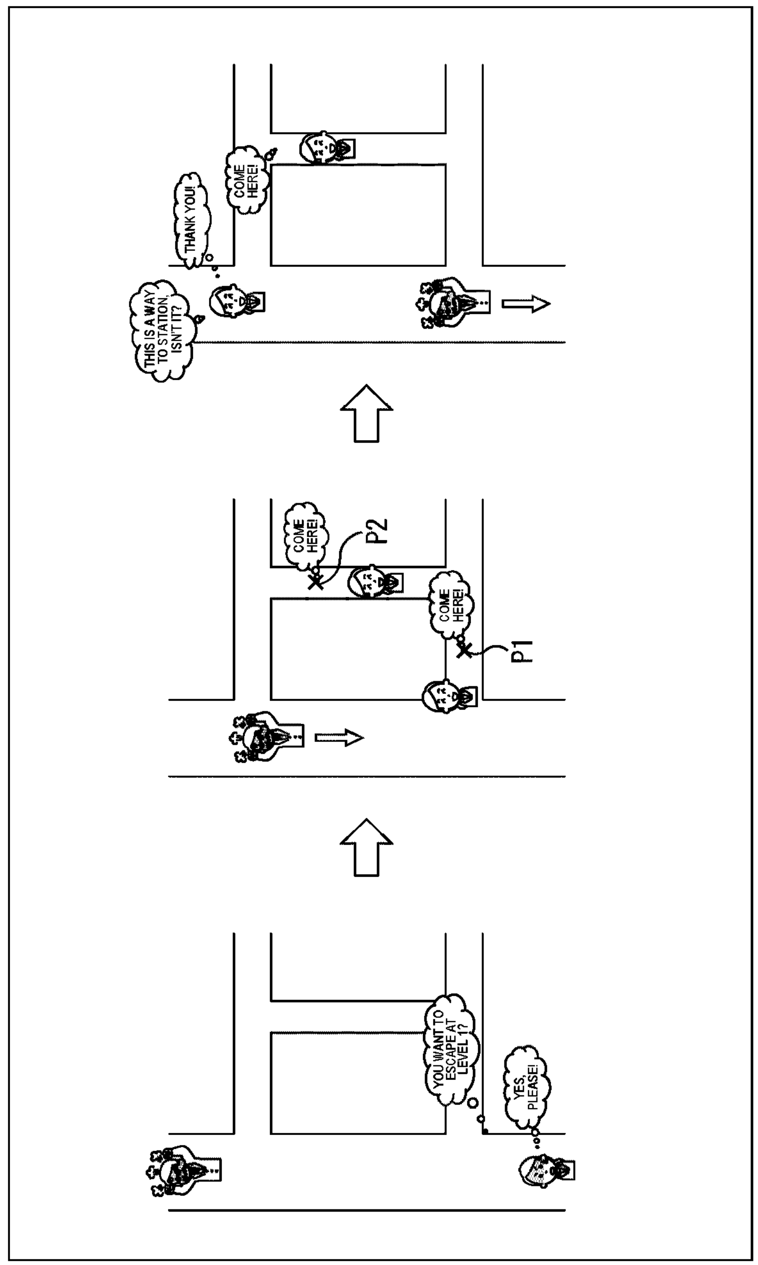
FIG. 11 is a diagram illustrating an example of avoidance using a voice AR.

FIG. 11 is a diagram illustrating an example of avoidance using voice augmented reality (AR).

The voice AR is a technology that generates a virtual sound that is not a real sound to cause the user to hear the sound, so as to cause the user to recognize an occurrence that has not actually happened. For example, it is assumed that the user wears an earphone as the client terminal.

In a case where the action assistance server 1 detects an abnormality in response to the utterance of a word serving as the avoidance request from the user who has noticed the suspicious person, an inquiry as to whether or not to request avoidance at the desired avoidance level 1 is made to the user as illustrated on the left side of FIG. 11. The utterance of a word such as "please" in response to the inquiry from the action assistance server 1 designates the desired avoidance level.

The abnormality may be detected not only by the action assistance server 1 in response to the utterance from the user of a word serving as the avoidance request but also on the basis of a prediction about a case where the user comes into contact with the suspicious person, and a possibility that the user comes into contact with the suspicious person may be presented to the user. The prediction about a case where the user comes into contact with the suspicious person is made on the basis of the context.

The action assistance server 1 raises an event in which a person present in a detour calls to the user as a fictitious event. The situation in which the third party calls to the user is created by outputting a voice calling to the user from the earphone while changing a sound source position.

In the example illustrated in the center of FIG. 11, a voice of "Come here, come here" is output from the sound source position that is a position P1 after turning right at the corner, and subsequently, the voice of "Come here, come here" is output from the sound source position that is a position P2 after turning left at the next corner. The user can detour around the street along which the suspicious person is passing and return to the original street by selecting an action of walking toward the voice calling to the user as illustrated on the right side of FIG. 11.

When an event in which, for example, someone is calling to the user is raised, the user can naturally select an action of moving toward the voice calling to the user and can avoid the suspicious person in a natural manner. In a case where the user attempts to makes a detour with avoidance of the suspicious person in mind, this shows in behavior, and as a result, the user may avoid the suspicious person in an explicit manner, but the user can avoid a behavior such as explicit avoidance.

As the voice calling to the user, a voice that is audible to only the user may be output, or a voice that is audible to surrounding people including the suspicious person may be output. The output of the voice audible to the surrounding people is made by outputting the voice from a speaker installed at each position in town, such as the position P1 and the position P2. In this case, the action assistance server 1 generates an event in cooperation with a device different from the client terminal held by the user.

Example Using AR Object

Figure 12:
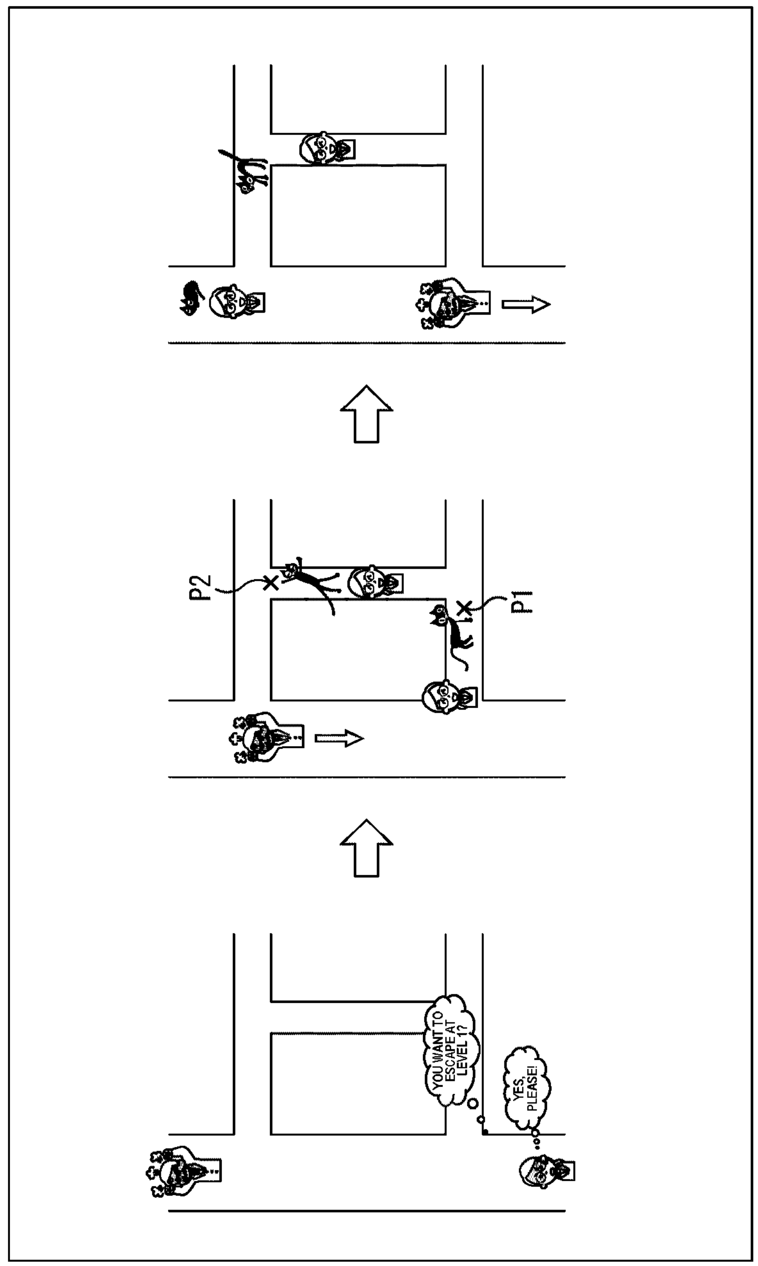
FIG. 12 is a diagram illustrating an example of avoidance using an AR object.

FIG. 12 is a diagram illustrating an example of avoidance using an AR object.

The AR object is, for example, a virtual object displayed on a transmissive HMD. The user can see an object that is not a real object superimposed on the front scene. It is assumed that the user wears the HMD as the client terminal. In FIG. 12, the glasses worn by the user correspond to the transmissive HMD. The AR object may be displayed using a non-transmissive HMD.

As illustrated on the left side of FIG. 12, in a case where the user who has noticed the suspicious person designates the desired avoidance level, the action assistance server 1 raises an event in which a black cat is caused to appear as a fictitious event. The situation in which the black cat is caused to appear is created by displaying the black cat as an AR object on the HMD. The black cat is displayed as if moving along the detour.

In the example illustrated in the center of FIG. 12, the black cat is displayed at a position P1 after turning right at a corner, and subsequently, the black cat is displayed at a position P2 after turning left at the next corner and moves forward. The user can detour around the street along which the suspicious person is passing and return to the original street by selecting an action of following the black cat as illustrated on the right side of FIG. 12.

When an event in which, for example, the black cat appears is raised, the user can naturally select an action of following the black cat and can avoid the suspicious person in a natural manner. As a matter of course, any AR object other than such a black cat may be displayed.

Example of Temporary Avoidance

Figure 13:
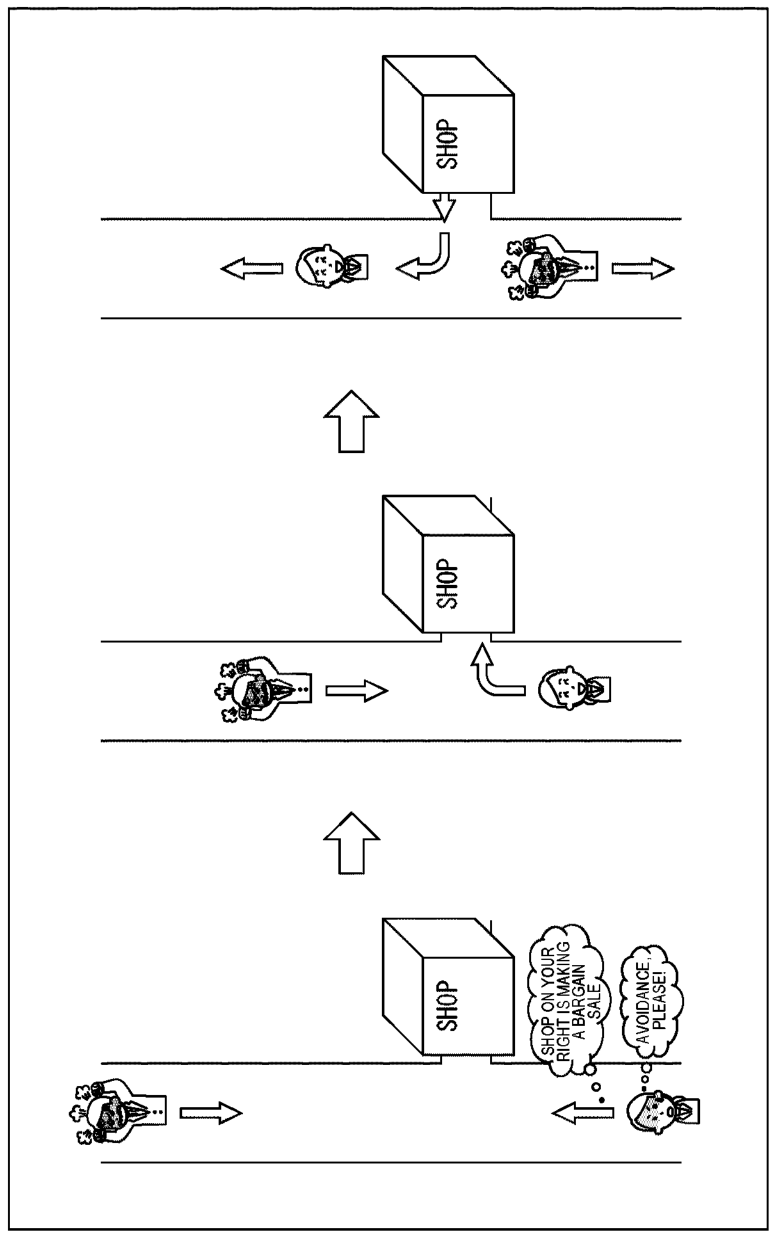
FIG. 13 is a diagram illustrating an example of avoidance using a shop.

FIG. 13 is a diagram illustrating an example of avoidance using a shop.

As illustrated in FIG. 13, it is assumed that there is a shop that matches the user's preference along the street along which the user is walking. The action assistance server 1 manages information such as user's preferences and values. It is assumed that the user has a smartphone as the client terminal.

In a case where the user who has noticed the suspicious person designates the desired avoidance level, the action assistance server 1 raises an event in which one of a plurality of shops that is located ahead of the user and that matches the user's preference has a bargain sale as a fictitious event, and the user is notified of the event as illustrated on the left side of FIG. 13. A plurality of shops that matches the user's preference may be notified together with their respective reasons.

Another fictitious event regarding a shop may be raised such as an event in which a product the user likes is sold in a shop that does not match the user's preference or an event in which a sales clerk who works in a shop that matches the user's preference is touting.

Thereafter, the user enters the shop as illustrated in the center of FIG. 13 while showing an interest in the bargain sale. The user can avoid the suspicious person by waiting for the suspicious person to go past the shop and then leaving the shop as illustrated on the right side of FIG. 13.

When an event such as a bargain sale at a shop that matches the user's preference, the user can naturally select an action of entering the shop while seeing how the shop looks like, so that the user can avoid the suspicious person in a natural manner.

As described above, in a case where avoidance at the desired avoidance level 1 is requested, various events that each create a situation in which the user can immediately avoid the other party with which the user is predicted to come into contact are raised and presented to the user and the like.

<Desired Avoidance Level 2>

Figure 14:
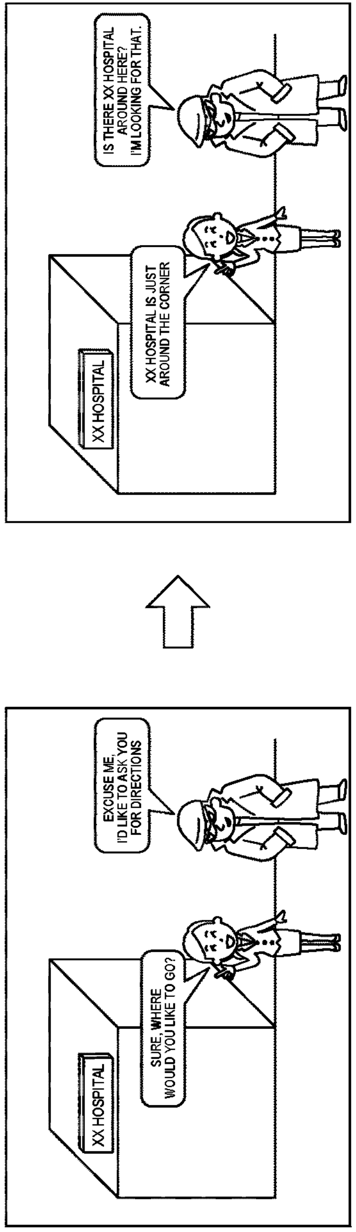
FIG. 14 is a diagram illustrating an example of a situation the user has encountered.

Example of avoidance attained by calling to user FIG. 14 is a diagram illustrating an example of a situation the user has encountered.

Figure 15:
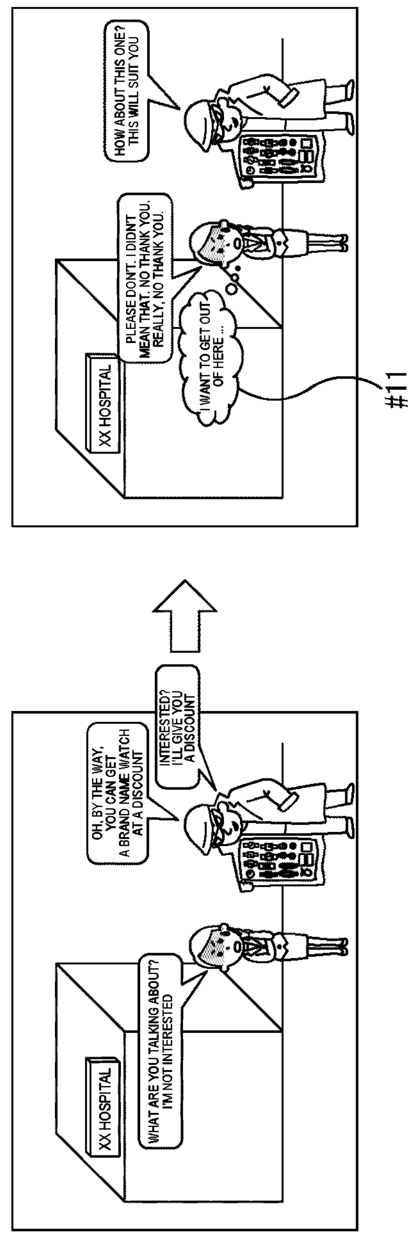
FIG. 15 is a diagram illustrating conversations between the user and the other party.

As illustrated in FIG. 14, a situation is assumed in which, when the user is walking in town, the user is called to by another party and is kindly showing the person the way. The situation illustrated in FIG. 14 is a situation after contact with the other party. It is assumed that, while the user is talking with the other party, what they are talking about is changed from the talk about route guidance to a talk about a different matter, and the atmosphere changes accordingly as illustrated in FIG. 15. As shown in a balloon #11, the user's feeling has changed from a state where the user is kindly responding to a state where the user desires to avoid the other party.

As illustrated on the left side of FIG. 16, in a case where the action assistance server 1 detects an abnormality in response to the utterance from the user of a word serving as the avoidance request, an inquiry as to whether or not to request avoidance at the desired avoidance level 2 is made to the user.

In the example illustrated on the left side of FIG. 16, "SOS, SOS, please let me get out of here immediately!" is a word serving as the avoidance request. The avoidance request at the desired avoidance level 2 may be made by uttering "Please don't" or applying vibrations to the client terminal.

In this example, the user wears a smartwatch as the client terminal. The voice under the control of the action assistance server 1 is output at a low volume from a speaker of the smartwatch. Furthermore, the voice of the user is detected by a microphone of the smartwatch. The smartwatch further includes a display provided on a housing of the smartwatch.

In a case where it is detected that the user's feeling has changed to a state where the user desires to avoid the other party, the action assistance server 1 detects an abnormality, and may inquire of the user as to whether or not to request avoidance. It is determined on the basis of the context that the user's feeling has changed to a state where the user desires to avoid the other party.

As illustrated on the right side of FIG. 16, when the user makes an affirmative response to the inquiry from the action assistance server 1, the desired avoidance level is designated.

The action assistance server 1 raises a fictitious event such as an event in which the third party calls to the user, thereby transmitting a message calling to the user to the smartwatch. That is, in this example, a situation in which the user needs to leave the place because the user is called to by a person is created.

FIG. 17 is a diagram illustrating an example of how to present an event.

As illustrated in a balloon #12 on the left side of FIG. 17, a message urging the user to hurry back to the office because a meeting is about to start appears on the display of the smartwatch. The user who has seen the message can avoid the other party in a natural manner by telling the other party that the user needs to hurry back and then leaving rather than in an explicit manner.

That is, when an event such as an event in which the user is called, the user can naturally select an action of leaving in response to the call and can avoid the other party in a natural manner. Furthermore, the user can give the other party a sense of satisfaction at leaving the place by casually showing the other party the message when the user checks the message.

The message for calling the user is transmitted by, for example, e-mail or short message service (SMS). Alternatively, an incoming call may be transferred to the smartwatch so as to call the user by voice.

In the example illustrated in FIG. 17, a message directly indicating that the user needs to hurry back, such as "Hurry!", is transmitted, but a message indicating that the user needs to hurry back, such as "Shopping finished?", "How long do I have to wait?", or the like, may be transmitted in a manner that depends on the inquiry.

Example of avoidance attained by call from cooperator Fug. 18 is a diagram illustrating an example of avoidance.

In some situations, it may be difficult for the user to confirm the message. In a case where a friend or the like is registered in advance as a cooperator of the user, and the cooperator is near the user, the action assistance server 1 may request the cooperator to talk to the user who is in trouble because of being talked to by the other party. The action assistance server 1 manages a position of each cooperator of the user together with who the cooperator is.

Figure 18:
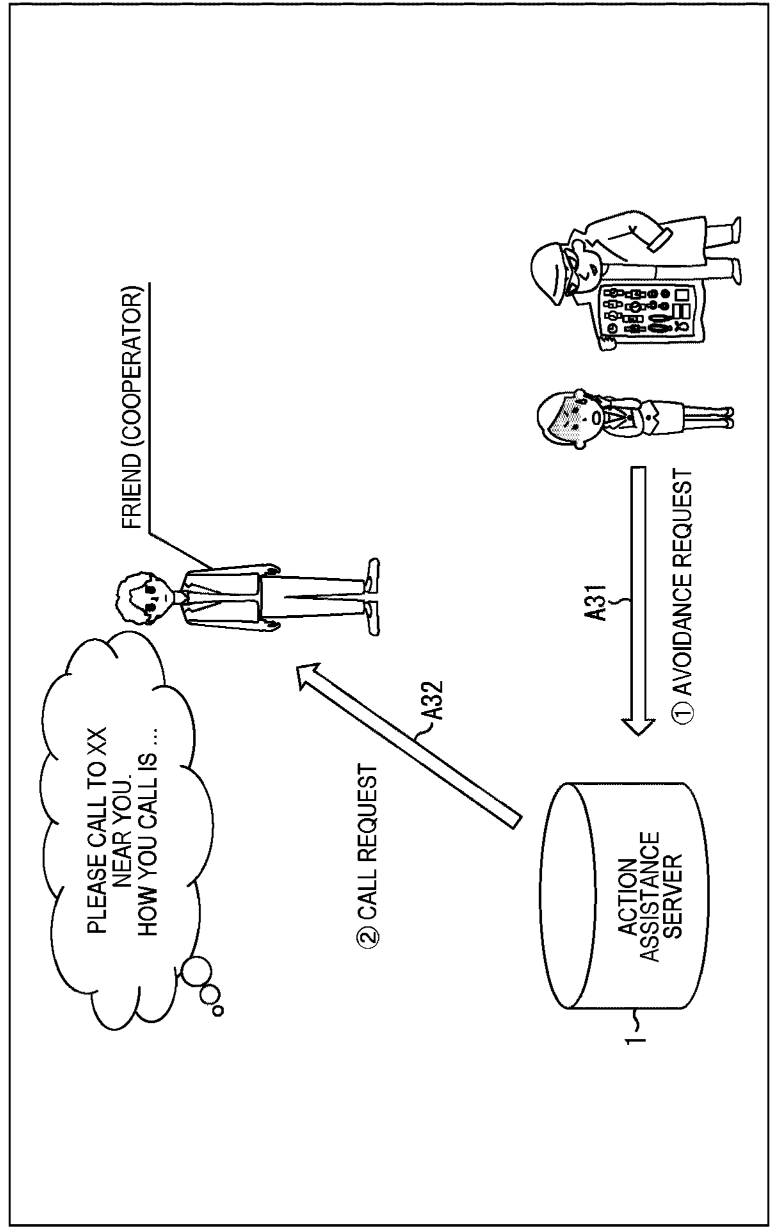
FIG. 18 is a diagram illustrating an example of avoidance using a call from a cooperator.

In the example illustrated in FIG. 18, in response to the avoidance request made as indicated by an arrow A31, a call request that is a request to call to the user is made to the cooperator as indicated by an arrow A32. The action assistance server 1 also notifies the cooperator of how the cooperator calls to such as "Please tell the user to hurry back because there is a meeting". For example, the cooperator is notified of a fictitious event in which the cooperator tells the user to hurry back. The call request is made by e-mail, SMS, telephone, or the like.

Even in a case where the cooperator calls, a fictitious event in which the cooperator who is a third party calls to the user is generated so as to create a situation in which the user needs to leave the place because the user is called to by a person.

The cooperator who has received the request from the action assistance server 1 goes to the site as illustrated in FIG. 19 and calls to the user in accordance with the notification from the action assistance server 1. The user who has been called to by the cooperator leaves together with the cooperator, so that the user can avoid the other party in a natural manner rather than in an explicit manner.

A plurality of persons is registered as cooperators to call to the user. The cooperator may be an acquaintance of the user or may be a stranger to the user. In a case where the cooperator is a stranger to the user, the action assistance server 1 notifies the cooperator of the user who the cooperator needs to call to together with information indicating the features of the user such as a face image.

The cooperator who has received the call request may call the user, rather than directly going to the site, so as to tell the user to hurry back. The user can appeal, to the other party, the situation in which the user is being called by answering the call from the cooperator.

As described above, in a case where avoidance at the desired avoidance level 2 is requested, various events that each create a situation in which the user avoids, by all means, the other party with which the user is in contact and are presented to the user.

<Desired Avoidance Level 3>

The desired avoidance level 3 is a desired avoidance level applied to a case where the user desires to avoid, if possible, the other party with which the user is in contact. The avoidance at the desired avoidance level 3 is triggered, for example, in response to a notification of things to do that can be used as a reason for avoidance given from the action assistance server 1 to the user. As a fictitious event, things to do for the user are generated in accordance with the context, and the user is notified of the things to do.

In response to the notification from the action assistance server 1, the user avoids the other party because the user has things to do of which the action assistance server 1 has notified the user.

FIG. 20 is a diagram illustrating an example of a notification from the action assistance server 1.

In the example illustrated in FIG. 20, a notification of avoidance of the other party because the user goes to a bathroom is made. After confirming the notification illustrated in FIG. 20, the user notifies the other party that the user wants to go to the bathroom so as to avoid the other party in a natural manner. For example, in a case where the context of the user indicates that the user has not been to the bathroom for at least a certain period of time, going to the bathroom is selected as things to do.

The things to do of which the action assistance server 1 has notified the user may be shopping, work, study, or the like other than going to the bathroom.

In a case where the user thinks of the reason for avoidance by himself/herself, lying appears in behavior, and it may be difficult for the user to leave in a natural manner. When the action assistance server 1 determines the reason for avoidance in accordance with the context and presents the reason to the user, the user can tell the other party the reason for leaving without hesitation and can avoid the other party in a natural manner.

As described above, in a case where avoidance at the desired avoidance level 3 is requested, various events that each create a situation in which the user can avoid, if possible, the other party with which the user is in contact and are presented to the user.

<<Case where the Other Party is an Acquaintance>>

In a case where the other party is an acquaintance, when the user has avoided the same other party at least once, an avoidance action different from the avoidance action used in the past is used.

Figure 21:
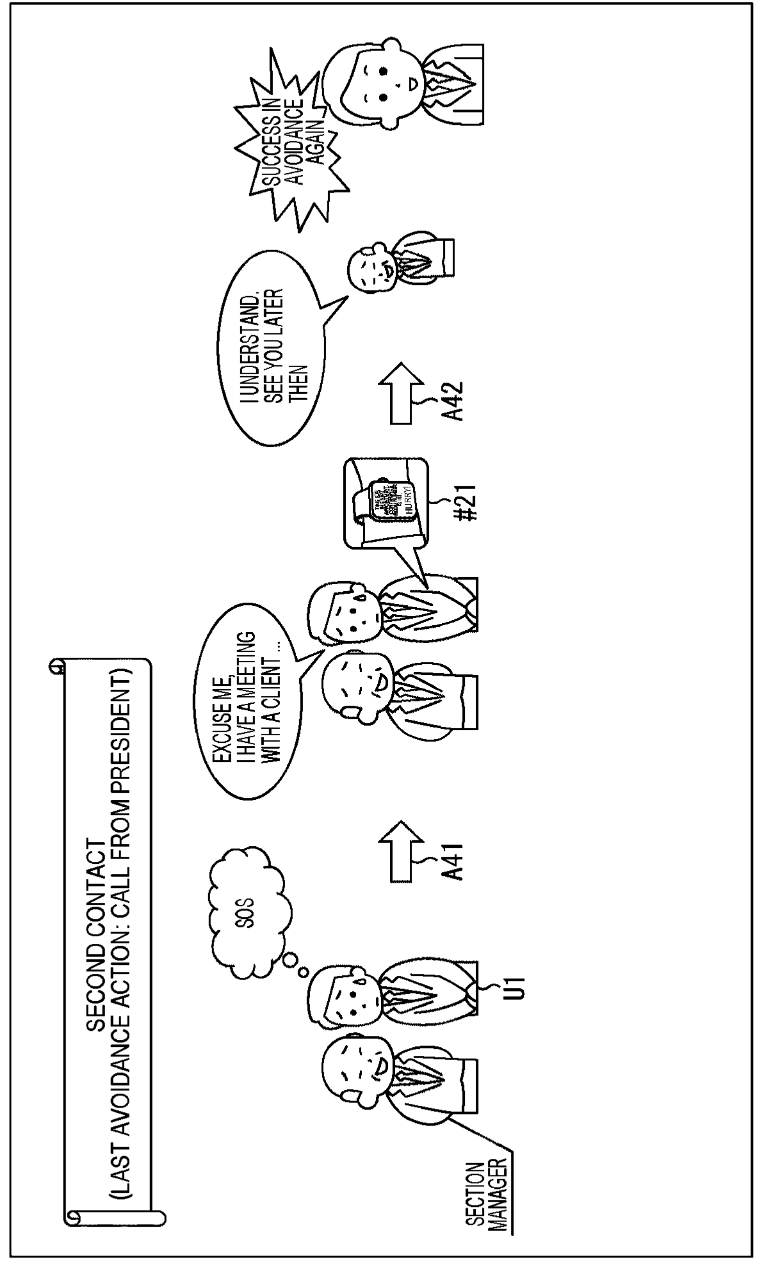
FIG. 21 is a diagram illustrating how the user attains avoidance.

FIG. 21 is a diagram illustrating how the user attains avoidance.

The situation illustrated on the left side of FIG. 21 is a situation in which the user is talked to again by the section manager who is his/her superior. The user is talked to by the section manager on, for example, the day following the first avoidance of the situation as described with reference to FIG. 2. The user wants to avoid the current situation again.

In such a situation, in a case where the user U1 makes a request to avoid the other party, a meeting with a client is raised as a fictitious event, and the user is notified that the user needs to hurry back as indicated by an arrow A41. As illustrated in a balloon #21, a message urging the user to hurry back to the office because the meeting is about to start appears on the display of the smartwatch which the user wears.

That is, since it is the second time to avoid the section manager, an avoidance action different from the first avoidance action is selected, and a corresponding event is raised. The first avoidance action described with reference to FIG. 2 is an avoidance action using the incoming call from the president as a fictitious event.

The user U1 sees the display on the smartwatch and notifies the section manager that there is a meeting with the client. The user U1 selects an action of going to the meeting with the client, thereby allowing the user U1 to avoid the lecture given by the section manager as indicated by an arrow A42.

As described above, in a case where the other party is an acquaintance, an avoidance action different from the avoidance action used in the past is used. In a case where the same person is avoided by the same avoidance action, there is a possibility that the other party becomes suspicious and the future relationship is impaired, but such a situation can be avoided.

The operation of the action assistance server 1 in a case where the other party is an acquaintance is basically similar to the operation in a case where the other party is a stranger, except that an avoidance action different from the avoidance action used in the past is used.

Figure 22:
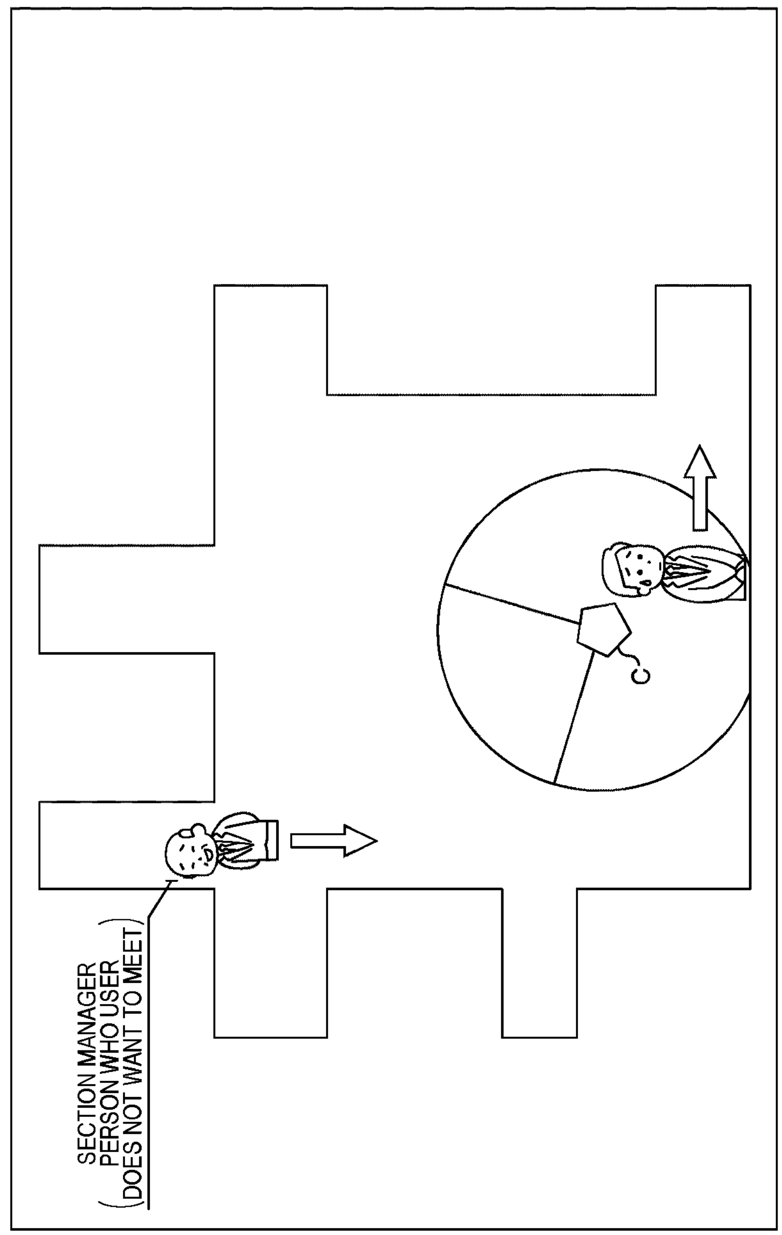
FIG. 22 is a diagram illustrating an example of avoidance of an acquaintance.

FIG. 22 is a diagram illustrating an example of avoidance of an acquaintance.

In a case where there is a person who the user wants to avoid, that is, a person who the user does not want to meet, the user registers information regarding the person such as a face image of the person in the action assistance server 1 in advance. Other information that can be used to identify a person who the user does not want to meet such as an ID of the person, and features of appearance, may be registered. In the action assistance server 1, for example, a person the same as the person preregistered is determined to be an acquaintance of the user, and a person different from the person preregistered is determined to be a stranger to the user.

As illustrated in FIG. 22, while the user is in an office, for example, an image captured by a camera mounted on the client terminal held by the user is continuously transmitted to the action assistance server 1. For example, a wide-angle image captured by a camera C capable of capturing an image of an area in a range of 360 degrees around the user is transmitted to the action assistance server 1.

Figure 23:
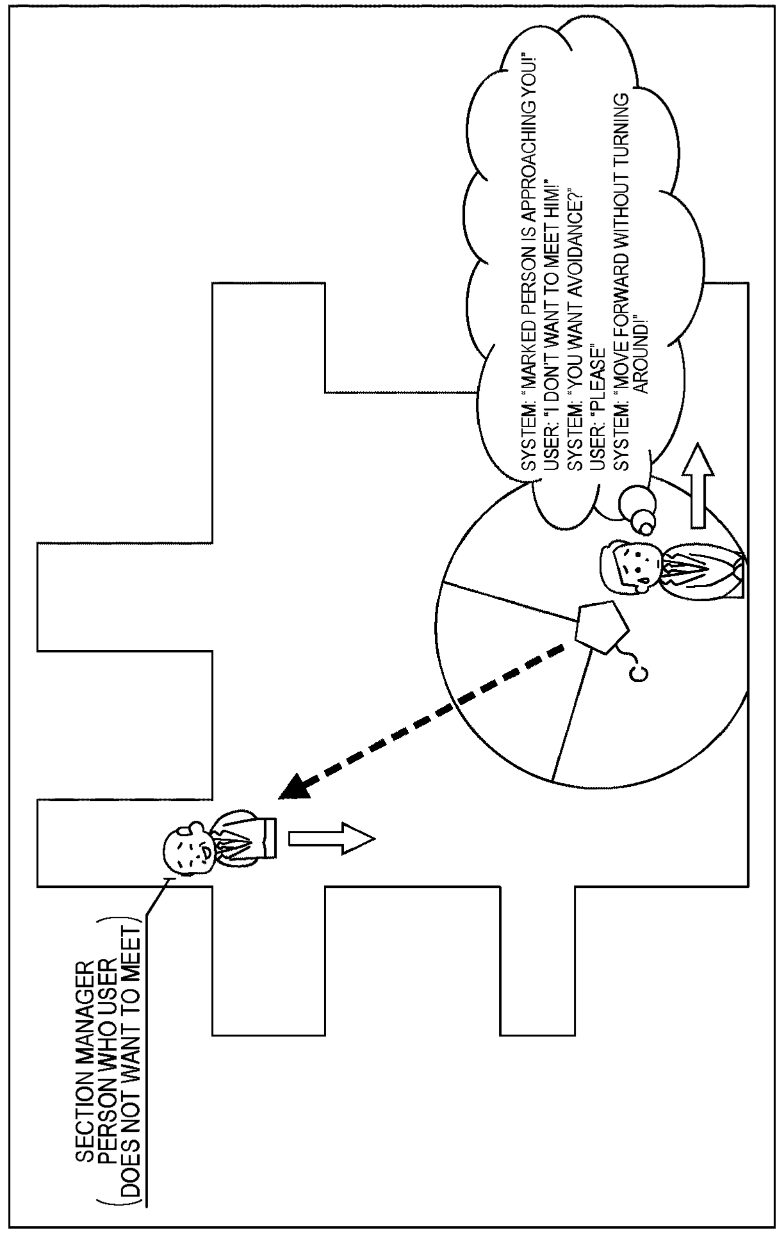
FIG. 23 is a diagram illustrating an example of avoidance of an acquaintance.

In the action assistance server 1, a captured image showing the surroundings of the user is analyzed, and, in a case where there is a person, the person is identified. In a case where a situation in which the section manager registered as a person who the user does not want to meet is near the user and coming close to the user is detected as context, an inquiry as to whether or not to request avoidance is made as illustrated in a balloon in FIG. 23. In a case where the avoidance request is made in response to the inquiry, when the traveling direction of the user is a direction away from the section manager, the user is notified that the user needs to move forward without turning around.

Figure 24A:
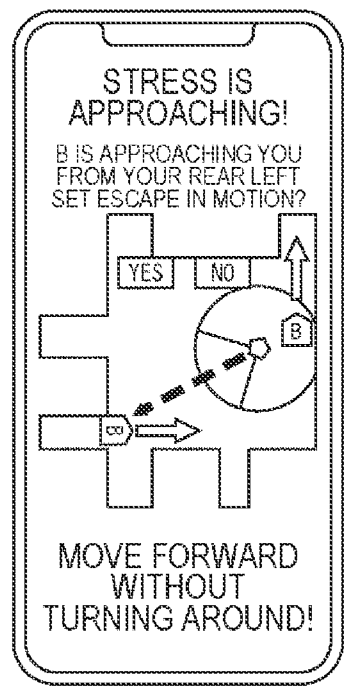
FIGS. 24A and 24B are diagrams illustrating an example of an output notification.
Figure 24B:
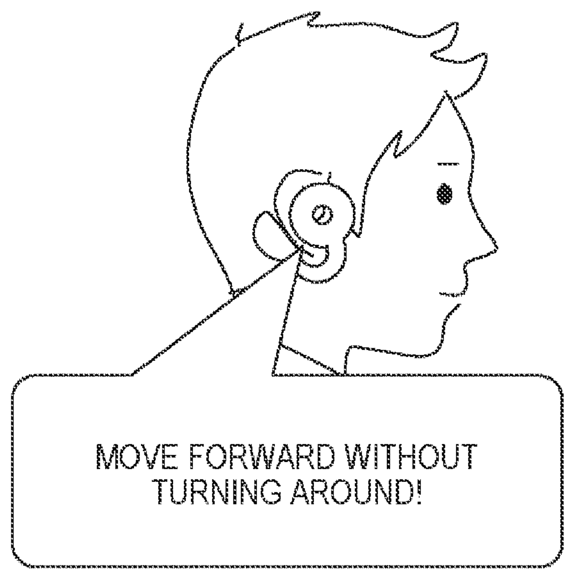

FIGS. 24A and 24B are diagrams illustrating an example of an output notification.

In a case where the client terminal held by the user is a smartphone, the user is notified that the user needs to move forward without turning around using the display on the display as illustrated in FIG. 24A. Furthermore, in a case where the user wears an earphone, the user is notified by voice that the user needs to move forward without turning around as illustrated in FIG. 24B.

In a case where the user is talked to by the section manager despite such guidance, the use avoids the section manager at the desired avoidance level 2 as described with reference to FIG. 21. Note that, even in a case where the other party is an acquaintance of the user, the user designates the desired avoidance level as needed.

Rather than simple guidance, a fictitious event as described above may be raised before the user comes into with the other party so as to cause the user to select an action to avoid the section manager.

Figure 25:
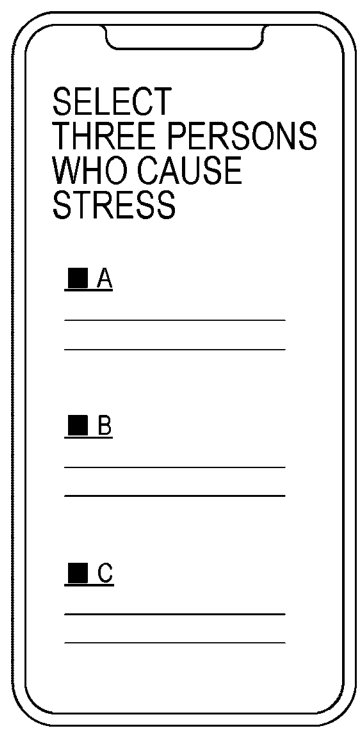
FIG. 25 is a diagram illustrating an example of a screen on which a person who the user does not want to meet is registered.

FIG. 25 is a diagram illustrating an example of a registration screen on which a person who the user does not want to meet is registered.

In a case where an action assistance application installed on a smartphone that is the client terminal is launched, and the user performs a predetermined operation, a registration screen as illustrated in FIG. 25 is displayed. The action assistance application is an application program that implements a function of assisting in selecting an action as described above in cooperation with the action assistance server 1. The registration screen illustrated in FIG. 25 is displayed on the basis of information transmitted from the action assistance server 1 via communications performed between the action assistance application and the action assistance server 1.

In the example illustrated in FIG. 25, three acquaintances can be registered as persons who the user does not want to meet. A "person who causes stress" in the message illustrated in FIG. 25 indicates a person who the user does not want to meet.

As information regarding a person who the user does not want to meet, a face image, a name, a nickname, a personality, and the like are registered. The desired avoidance level or the avoidance action may be registered for each person who the user does not want to meet.

<<Determination of Avoidance Action with User's Values Taken into Account>>

Even in a case where the user has encountered the same situation, a preferred avoidance action differs from person to person. In other words, the preferred avoidance action differs in a manner that depends on each person's values. The action assistance server 1 may determine the avoidance action using the user's values.

Figure 26:
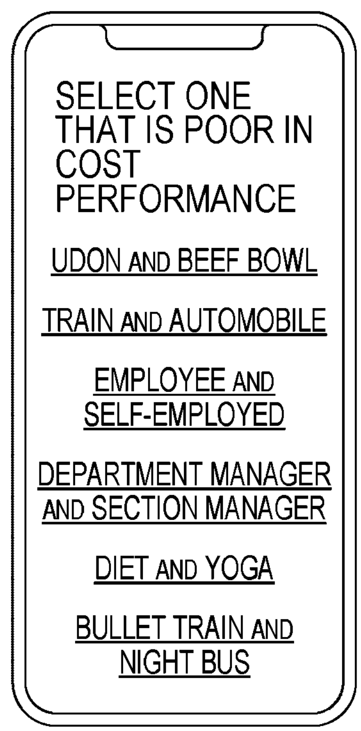
FIG. 26 is a diagram illustrating an example of a questionnaire screen.

FIG. 26 is a diagram illustrating an example of a questionnaire screen displayed by the action assistance application.

In the example illustrated in FIG. 26, selecting, from two choices, an item considered to be poor in cost performance causes the questionnaire to proceed. The user checks the two choices to instantaneously determine which item is poor in cost performance, and selects one of the choices.

For example, which one of a "department manager" and an "employee" is considered to be poor (low) in cost performance is a question asking about values regarding a way of life. It can be said that the user who thinks that the "department manager" is higher in cost performance is a user who has a desire to succeed, desires a social position, and has values of emphasizing an organization. On the other hand, it can be said that the user who thinks that the "employee" is higher in cost performance is a user who has no desire to succeed, does not have a strong desire for social position, and has values of emphasizing himself/herself.

The action assistance server 1 analyzes the user's answer to the questionnaire to specify a value type that is a type (group) corresponding to the user's values.

FIG. 27 is a diagram illustrating examples of the value type.

As illustrated in FIG. 27, for example, three value types, A type, B type, and C type, are prepared. One of the three value types is specified in accordance with the user's values. Four or more value types may be prepared.

For example, the A type is a value type in which an avoidance action is selected with the superior's mood and convenience taken into consideration without destroying the atmosphere. The type B is a value type in which an avoidance action of attaining avoidance by all means is selected regardless of whether it gives a bad expression. The C type is a value type in which an avoidance action that makes good use of the relationship with the other party while replying evasively is selected.

In the questionnaire for selecting either the "department manager" or the "employee" described with reference to FIG. 26, the type A tends to be specified as the value type of the user who considers the "department manager" to be higher in cost performance, for example. Furthermore, the type B tends to be specified as the value type of the user who considers the "employee" to be higher in higher cost performance, for example.

An avoidance action with the values of each user taken into consideration is determined using the value type thus specified. For example, an avoidance action with the values taken into consideration is determined using the value type as input to the avoidance action determination model M.

Figure 28:
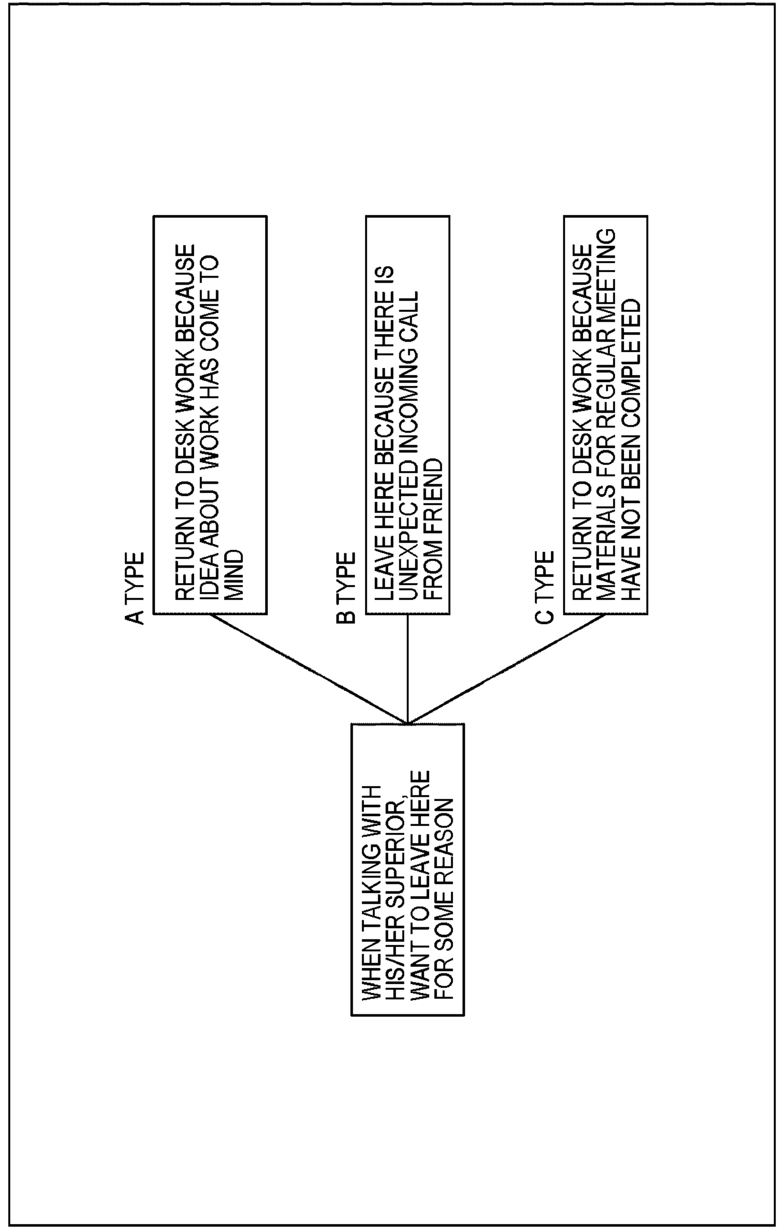
FIG. 28 is a diagram illustrating an example of an avoidance action for each value type.

FIG. 28 is a diagram illustrating an example of an avoidance action for each value type.

Each of the avoidance actions illustrated in FIG. 28 is an avoidance action applied to a situation in which the user thinks that the user wants to leave the place in a case where the user is talking with his/her superior.

For example, as an avoidance action for a user whose value type is the A type, an avoidance action of returning to desk work because an idea about work has come to mind is selected. In this case, an event in which the idea about work comes to mind is a fictitious event. For example, in response to a notification from the action assistance server 1, the user leaves his/her superior, saying a word such as "A good idea has come to mind, so that I will immediately return to my desk and give a concrete form to the idea before I forget it!".

As an avoidance action for a user whose value type is the B type, an avoidance action of leaving the place because there is an incoming call from his/her friend is selected. In this case, an event in which the incoming call is received from the friend is a fictitious event. For example, in response to a notification from the action assistance server 1, the user leaves his/her superior, leaving a word such as "Excuse me, I have a call".

As an avoidance action for a user whose value type is the C type, an avoidance action of leaving the place to return to desk work because materials for a regular meeting have not been completed is selected. In this case, an event in which the materials for the regular meeting have not been completed is a fictitious event. For example, in response to a notification from the action assistance server 1, the user leaves his/her superior saying a word such as "Excuse me, I have not finished preparing the materials, so I have to deal with it in a hurry. I am really sorry for leaving".

Determining the avoidance action using the value type allows the user to avoid the other party using the avoidance action that matches his/her values. The avoidance action may be determined on the basis of not only the values but also other attributes of the user such as a hobby or a preference.

<<Configuration of Each Device>>

Here, a configuration of each device that implements the action assistance system will be described.

<Configuration of Action Assistance Server 1>

Figure 29:
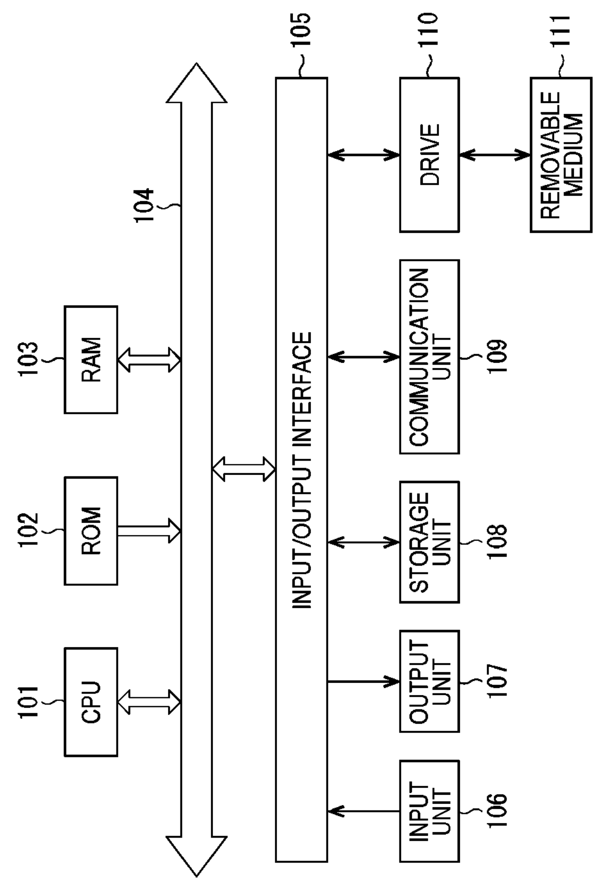
FIG. 29 is a block diagram illustrating a hardware configuration example of the action assistance server.

FIG. 29 is a block diagram illustrating a hardware configuration example of the action assistance server 1.

As illustrated in FIG. 29, the action assistance server 1 includes a computer. The action assistance server 1 may be implemented by a plurality of computers.

A central processing unit (CPU) 101, a read only memory (ROM) 102, and a random access memory (RAM) 103 are mutually connected over a bus 104.

An input/output interface 105 is further connected to the bus 104. An input unit 106 including a keyboard, a mouse, or the like, and an output unit 107 including a display, a speaker, or the like are connected to the input/output interface 105.

Furthermore, a storage unit 108, a communication unit 109, and a drive 110 are connected to the input/output interface 105.

The storage unit 108 includes a hard disk, a nonvolatile memory, or the like. The storage unit 108 stores a program to be executed by the CPU 101 and various types of information such as information regarding each user.

The communication unit 109 includes a network interface or the like. The communication unit 109 communicates with various devices that implement the action assistance system, such as a client terminal held by each user and a client terminal held by a cooperator, over the Internet.

Figure 30:
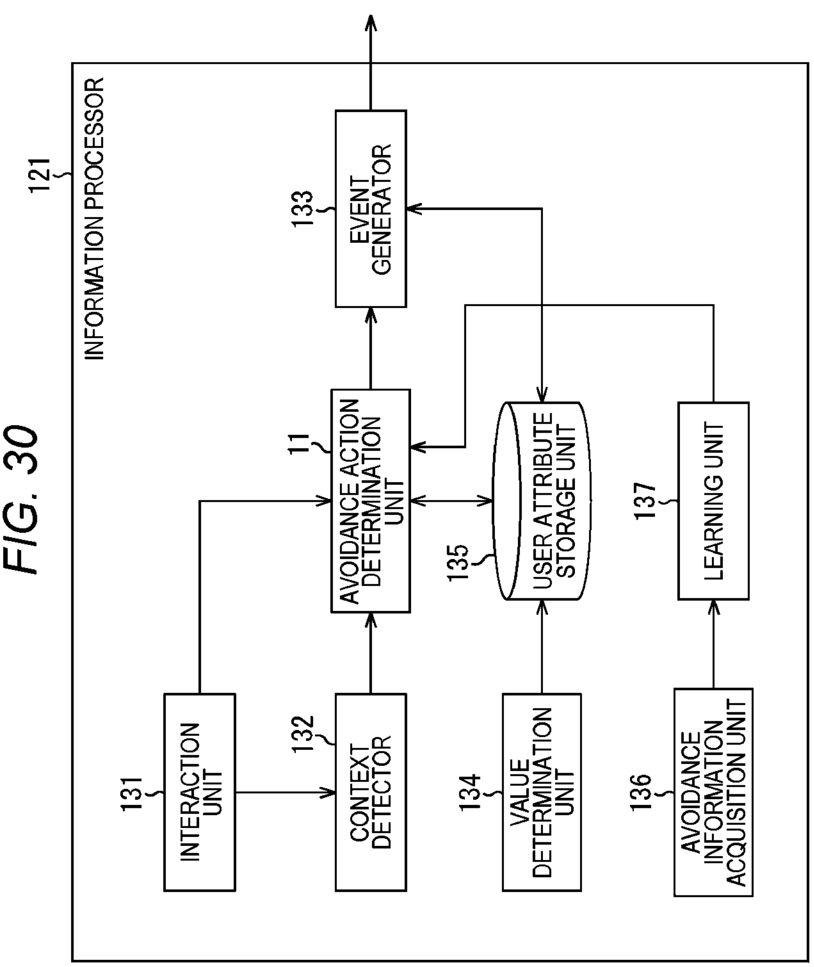
FIG. 30 is a block diagram illustrating a functional configuration example of the action assistance server.

FIG. 30 is a block diagram illustrating a functional configuration example of the action assistance server 1.

At least some of the functional units illustrated in FIG. 30 are implemented by a predetermined program executed by the CPU 101 illustrated in FIG. 29. In the action assistance server 1, an information processor 121 is implemented. The information processor 121 includes, in addition to the above-described avoidance action determination unit 11, an interaction unit 131, a context detector 132, an event generator 133, a value determination unit 134, a user attribute storage unit 135, an avoidance information acquisition unit 136, and a learning unit 137.

The interaction unit 131 communicates with the client terminal to interact with the user. The interaction with the interaction unit 131 is performed by voice or text. Various interactions are performed with the user, such as an interaction for the avoidance request, an interaction for confirmation of the desired avoidance level, and the like.

Figure 8:
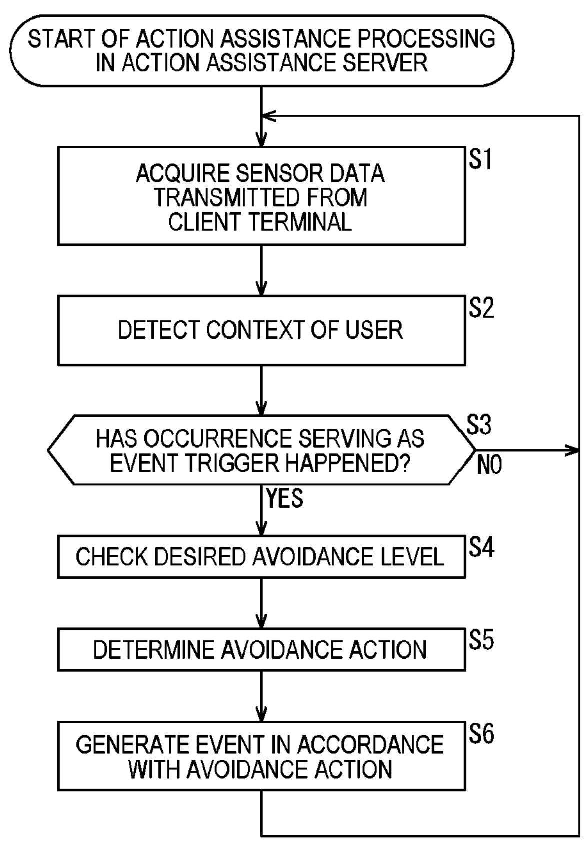
FIG. 8 is a flowchart illustrating action assistance processing in an action assistance server.

The above-described processing in step S4 illustrated in FIG. 8 is processing performed by the interaction unit 131. Information indicating that the user has made the avoidance request is supplied to the context detector 132. Furthermore, the information indicating the desired avoidance level that has been confirmed via the interactions with the user is supplied to the avoidance action determination unit 11.

The context detector 132 acquires sensor data transmitted from the client terminal, and detects the context of the user including the external situation and the internal situation as described above.

For example, the context detector 132 detects the external situation by analyzing an image captured by the camera of the client terminal or a voice detected by the microphone. Furthermore, the context detector 132 detects the internal situation by analyzing an image captured by the camera of the client terminal, a voice detected by the microphone, and a biological reaction of the user detected by the biological sensor.

The context detector 132 further detects the location of the user, the traveling direction of the user, and the direction of the line-of-sight of the user as context on the basis of sensor data detected by other sensors of the client terminal, such as a gyroscope, an accelerometer, and a positioning sensor. The context detector 132 further detects context such as whether or not there is a possibility of coming into contact with the suspicious person.

As described above, the context is detected by using at least one of the plurality of types of sensor data transmitted from the client terminal.

In a case where an occurrence serving as the event trigger happens, the context detector 132 outputs information regarding the detected context to the avoidance action determination unit 11. The processing in steps S1, S2, S3 illustrated in FIG. 8 is processing performed by the context detector 132.

The avoidance action determination unit 11 determines an avoidance action in accordance with the context of the user. As described with reference to FIG. 6, the avoidance action is determined in accordance with the context using the avoidance action determination model M. The output of the avoidance action determination model M obtained by inputting the information indicating the desired avoidance level supplied from the interaction unit 131, the information indicating the context supplied from the context detector 132, the information indicating the value type read from the user attribute storage unit 135, and the like is information indicating the avoidance action.

The information indicating the avoidance action determined by the avoidance action determination unit 11 is supplied to the event generator 133. The processing in step S5 illustrated in FIG. 8 is processing performed by the avoidance action determination unit 11.

The avoidance action may be determined on the basis of information indicating a correspondence relation between the context and the avoidance action set in advance, rather than by inference using the avoidance action determination model M. The avoidance action may be determined by predetermined computation performed on the basis of the information regarding the context. Various methods are applicable to a method for determining the avoidance action in accordance with the context.

The event generator 133 communicates with the client terminal to generate a fictitious event corresponding to the avoidance action determined by the avoidance action determination unit 11 and present the event to the user. As described above, the event is further presented to the other party of the user or a person around the user. The processing in step S6 illustrated in FIG. 8 is processing performed by the event generator 133.

The value determination unit 134 acquires an answer to the questionnaire given by the action assistance application to specify a value type in accordance with the user's values. The information regarding the value type specified by the value determination unit 134 is stored in the user attribute storage unit 135 together with the other information regarding the user.

The user attribute storage unit 135 stores various types of attribute information regarding the user, such as information regarding the client terminal, information regarding a person registered by the user as a person who the user does not want to meet, information regarding the value type, and information regarding the cooperator with all the pieces of information associated with, for example, the ID of the user. The information regarding the client terminal includes a specification and a position of the client terminal, information used for establishing communications with the client terminal, and the like. The information used for establishing communications with the client terminal includes information such as a phone number and a mail address of the client terminal.

Among such pieces of information stored in the user attribute storage unit 135, information used for determining the avoidance action, such as information regarding the value type, is read by the avoidance action determination unit 11. Furthermore, information used for generating an event, such as the information regarding the client terminal used for presenting an event, is read by the event generator 133.

The avoidance information acquisition unit 136 receives and acquires the avoidance information transmitted from each client terminal. Furthermore, the avoidance information acquisition unit 136 makes the avoidance information available to each user to allow each user to share the avoidance information. The avoidance information acquired by the avoidance information acquisition unit 136 is supplied to the learning unit 137.

The learning unit 137 performs learning of the avoidance action determination model M (learns parameters constituting the avoidance action determination model M) on the basis of the avoidance information acquired by the avoidance information acquisition unit 136. Information regarding the avoidance action determination model M obtained by learning performed by the learning unit 137 is supplied to the avoidance action determination unit 11.

The learning of the avoidance action determination model M may be performed only with avoidance information that is higher in score calculated on the basis of the evaluation of each user than a threshold, or may be performed only with avoidance information regarding an avoidance action that has succeeded in avoidance.

<Configuration of Client Terminal>

Figure 31:
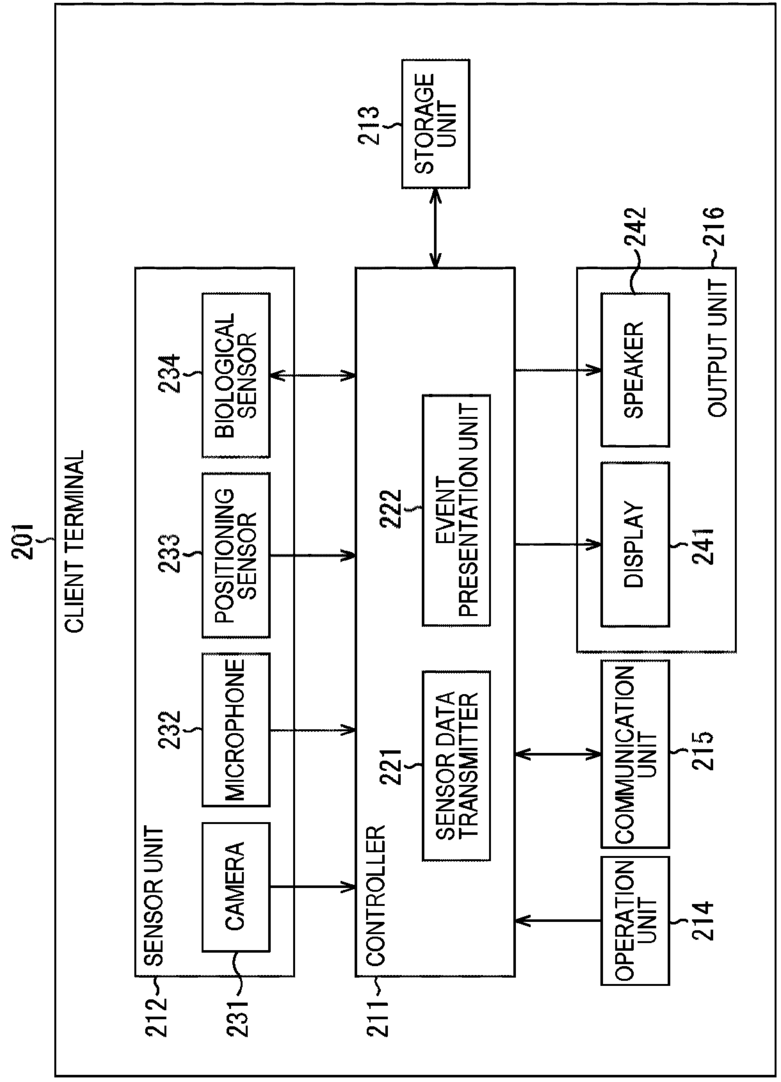
FIG. 31 is a block diagram illustrating a configuration example of a client terminal.

FIG. 31 is a block diagram illustrating a configuration example of a client terminal 201.

The client terminal 201 includes a sensor unit 212, a storage unit 213, an operation unit 214, a communication unit 215, and an output unit 216 that are all connected to a controller 211. The client terminal 201 is an information processing terminal constituting the action assistance system.

The controller 211 includes a CPU, a ROM, a RAM, and the like. The controller 211 causes the CPU to execute a predetermined program to control the entire operation of the client terminal 201. In the controller 211, a program such as the action assistance application is executed to implement a sensor data transmitter 221 and an event presentation unit 222.

The sensor data transmitter 221 communicates with the action assistance server 1 by controlling the communication unit 215, and transmits sensor data supplied from the sensor unit 212 to the action assistance server 1.

The sensor data including an image captured by a camera 231, a voice detected by a microphone 232, a position of the user detected by a positioning sensor 233, and biological data detected by a biological sensor 234 is supplied from the sensor unit 212. Data detected by the other sensors such as data detected by a gyroscope or an accelerometer and data detected by a temperature sensor may be included in the sensor data.

The event presentation unit 222 communicates with the action assistance server 1 by controlling the communication unit 215 to present an event under the control of the action assistance server 1.

For example, in a case of presenting an event in which an incoming call is received, the event presentation unit 222 displays information regarding a caller on a display 241 or outputs a ring tone from a speaker 242. Furthermore, in a case of guiding the user along the traveling direction, the event presentation unit 222 outputs, from the speaker 242, a navigation voice or a voice by which the third party calls to the user.

In a case where the client terminal 201 is an HMD, when guiding the user by displaying a virtual object, the event presentation unit 222 displays the virtual object on the display 241 provided in front of the user's eyes.

The event presentation unit 222 presents the event by various other methods such as displaying a message calling the user on the display 241. In a case where the event presentation is performed using a device external to the client terminal 201, the event presentation unit 222 communicates with the external device via the communication unit 215 to control the external device to perform processing such as the event presentation.

The sensor unit 212 includes the camera 231, the microphone 232, the positioning sensor 233, and the biological sensor 234.

The camera 231 captures an image of the surroundings of the user having the client terminal 201, and outputs the image thus captured to the controller 211. The image captured by the camera 231 may be a still image or a moving image.

The microphone 232 detects various sounds such as a voice of the user, a voice of the other party talking to the user, and an ambient sound, and outputs the sounds thus detected to the controller 211.

The positioning sensor 233 includes a GPS sensor or the like. The positioning sensor 233 detects the position of the client terminal 201 and outputs the position to the controller 211.

The biological sensor 234 includes a thermometer, a heart rate sensor, and the like. A sensor that detects brain waves such as an alpha wave or a beta wave may be included in the biological sensor 234. The biological sensor 234 detects biological data of the user such as a temperature, a heart rate, and brain waves, and outputs the biological data to the controller 211.

The storage unit 213 includes a flash memory or the like. The storage unit 213 stores various data such as the action assistance application.

The operation unit 214 includes a touchscreen provided on the display 241, a button provided at a predetermined position on a housing of the client terminal 201, and the like. The operation unit 214 detects a user's operation and outputs information indicating the content of the operation to the controller 211.

The communication unit 215 is an interface for short-range wireless communications such as Bluetooth (registered trademark) or a wireless LAN, and an interface for wireless communications using a mobile communications system (WAN) such as 4G or 5G. The communication unit 215 communicates with an external device such as the action assistance server 1.

The output unit 216 includes the display 241 and the speaker 242. The display 241 outputs various types of information under the control of the controller 211. The speaker 242 outputs various sounds or sound effects under the control of the controller 211.

Anther module serving as an interface with the user, such as a vibration generation module or a robot arm, may be provided in the output unit 216. Each component of the output unit 216 is used to present an event.

Note that the configuration of the client terminal 201 as described above is changed as needed in a manner that depends on the type of the client terminal 201 such as a smartphone, a smartwatch, or an HMD. Depending on the type of the client terminal 201, some of the components illustrated in FIG. 31 may not be provided, or another module not illustrated in FIG. 31 may be provided.

<<Modification>>

<Avoidance Reservation>

The user may preset an avoidance action based on context. In this case, future context and an avoidance action that is used when the context is detected are set by the user. The user can, so to speak, reserve an avoidance action.

The avoidance action reservation is made by setting the status (context), the desired avoidance level, the details of the event, and the like using a menu screen of the action assistance application. A setting regarding a place such as a path to go home, a train, a station, and a city center, a setting regarding an occurrence such as picking up, invitation, or drunk, and the like can be made using the menu screen.

In a case where the same context as the context set by the user is detected, an event for causing the user to attain avoidance using a preset avoidance action is raised by the action assistance server 1.

The avoidance action can be reserved, so that the user can prepare for a premonition that when going to a certain place, the user may suffer botheration.

<Assistance in Selecting Action for Bringing Two People Closer>

Although a case where an event for causing the user to avoid the other party, that is, for bringing the user away from the other party in response to the user's feeling that the other party is bothersome has been described, an event for reducing the distance between the user and the other party may be raised. The event for reducing the distance between the user and the other party is raised in response to the user's feeling that the distance to the other party is long. The event for reducing the distance between the user and the other party is also a fictitious event, for example.

When the user selects an action in accordance with the raised event, the distance between the user and the other party is reduced, and the user and the other party can both feel relaxed accordingly. The assistance given by the action assistance server 1 is assistance in selecting an action for bringing the user and the other party close to each other to allow the user and the other party to both feel relaxed.

The details of the event for allowing the user and the other party to both feel relaxed also differ in a manner that depends on context including whether or not the other party is an acquaintance of the user or a desired relaxing level.

For example, in a case where the user makes a request to raise an event because the user feels that his/her friend looks depressed, the action assistance server 1 raises a fictitious event such as an event in which a stranger calls the user. The user responds to a wrong call from the stranger and talks about the happening, that is the wrong call, thereby allowing the user to come close to the other party and feel relaxed.

In a case where a situation in which the user gets excited as a result of talking with his/her friend, the action assistance server 1 may make a proposal to the user to go to a nearby cafe and start route guidance using the screen of the client terminal.

Furthermore, an event in which a common friend between the user and the other party appears as a cooperator, and the cooperator goes to the cafe together with the two may be raised. Also in this case, the action assistance server 1 notifies the cooperator of a fictitious event as how the cooperator calls to.

The action assistance server 1 may notify the user of a certain question to make a proposal to the user to ask the other party the same question, rather than raising a fictitious event. Asking his/her friend a question "What has brought relief to you recently?" or asking a person who is a stranger eating ice cream in the street a question "Where did you buy it?" allows a reduction in distance between the user and the other party.

As described above, it is also possible to cause the action assistance server 1 to raise an event for reducing the distance between the user and the other party rather than an event for increasing the distance between the user and the other party.

That is, the action assistance server 1 is an information processing device that assists the user in selecting an action by generating a fictitious event that may cause an increase or decrease in distance between the user and the other party the user has encountered. The distance between the user and the other party includes not only a physical distance but also a mental distance.

<Others>

A series of processing described with reference to FIG. 8 such as detection of context and determination of an avoidance action may be performed by the client terminal 201. In this case, the information processor 121 illustrated in FIG. 30 is provided in the client terminal 201. The information processor 121 is implemented by the action assistance application executed in the client terminal 201.

About Program

The above-described series of processing may be performed by hardware or software. In a case where the series of processing is performed by software, a program constituting the software is installed on a computer incorporated into dedicated hardware, a general-purpose personal computer, or the like.

The program to be installed is provided via a removable medium 111 on which the program is recorded, the removable medium 111 including an optical disc (compact disc-read only memory (CD-ROM), digital versatile disc (DVD), or the like), a semiconductor memory, or the like. Alternatively, the program may be provided via a wired or wireless transmission medium such as a local area network, the Internet, or digital broadcasting. Alternatively, the program may be preinstalled on the ROM 102 or the storage unit 108.

Note that the program to be executed by the computer may be a program in which the processes are performed in time-series order described herein, or may be a program in which the processes are performed in parallel or at a required timing such as when a corresponding process is called.

Herein, a system means a set of a plurality of components (devices, modules (parts), etc.), regardless of whether or not all the components are in the same housing. Therefore, a plurality of devices housed in separate housings and connected over a network, and one device in which a plurality of modules is housed in one housing are both systems.

Note that the effects described herein are merely examples and are not limited, and other effects may be provided.

The embodiments of the present technology are not limited to the above-described embodiments, and various modifications may be made without departing from the gist of the present technology.

For example, the present technology may have a configuration of cloud computing in which a function is shared and processed in cooperation among a plurality of devices over a network.

Furthermore, each step described in the above-described flowcharts may be performed by one device or may be shared and performed by a plurality of devices.

Moreover, in a case where a plurality of processes is included in one step, the plurality of processes included in the one step may be performed by one device or may be shared and performed by a plurality of devices.

Example of Combination of Configurations

The present technology may also have the following configurations.

(1) An information processing device including an information processor configured to generate an event, which is a fictitious event, to change a distance between a user and another party the user has encountered in accordance with context of the user and present the event to the user.

(2) The information processing device according to the above (1), in which the information processor presents the event to not only the user but also a person around the user, the person including at least the another party.

(3) The information processing device according to the above (1) or (2), in which the information processor generates the event whose details differ in a manner that depends on whether the another party is an acquaintance of the user or a stranger to the user.

(4) The information processing device according to the above (3), in which in a case where the another party is an acquaintance of the user, the information processor generates the event different in details from the event that has been generated for a same person as the another party.

(5) The information processing device according to the above (3) or (4), in which the information processor generates the event with a person who is the same as a person preregistered by the user regarded as an acquaintance and a person who is different from the person preregistered by the user regarded as a stranger.

(6) The information processing device according to any one of the above (1) to (5), in which the information processor generates the event whose details differ in a manner that depends on a level indicating a degree of desire to change the distance between the user and the another party.

(7) The information processing device according to the above (6), in which the information processor generates the event whose details differ in a manner that depends on the level designated by the user.

(8) The information processing device according to any one of the above (1) to (7), further including a context detector configured to detect the context on the basis of sensor data detected by a sensor, in which the information processor generates the event in a case where the context indicating that the user has uttered a predetermined word that triggers the event is detected or in a case where the context indicating that the user has a predetermined biological reaction is detected.

(9) The information processing device according to any one of the above (1) to (8), in which the information processor generates the event to increase the distance between the user and the another party.

(10) The information processing device according to the above (9), in which in a case where the user and the another party are predicted to come into contact with each other, the information processor generates the event to guide the user along a traveling direction so as to move away from the another party.

(11) The information processing device according to the above (9) or (10), in which the information processor presents to the user that the user and the another party are predicted to come into contact with each other, and generates the event in response to an instruction from the user to increase the distance between the user and the another party.

(12) The information processing device according to any one of the above (9) to (11), in which the information processor presents the event to the user by causing a device held by the user to output a voice notifying the user of the details of the event.

(13) The information processing device according to the above (9), in which in a case where the user and the another party are in contact with each other, the information processor generates, when the context of the user changes to a state where the user desires to increase the distance between the user and the another party, the event to increase the distance between the user and the another party.

(14) The information processing device according to the above (13), in which the information processor generates a situation in which a third party calls the user as the event, and causes a device held by the user to output information indicating details of how to call the user.

(15) The information processing device according to the above (13), in which the information processor generates things to do for the user as the event, and causes a device held by the user to output information indicating details of the things to do.

(16) An information processing method including causing an information processing device to generate an event, which is a fictitious event, to change a distance between a user and another party the user has encountered in accordance with context of the user and present the event to the user.

(17) A program for causing a computer to execute processing of generating an event, which is a fictitious event, to change a distance between a user and another party the user has encountered in accordance with context of the user and presenting the event to the user.

(18) An information processing system including:

an information processing device including an information processor configured to generate an event, which is a fictitious event, to change a distance between a user and another party the user has encountered in accordance with context of the user; and an information processing terminal including an output unit configured to present the event to the user under control of the information processing device.

REFERENCE SIGNS LIST

1 Action assistance server
11 Avoidance action determination unit
121 Information processor
131 Interaction unit
132 Context detector
133 Event generator
134 Value determination unit
135 User attribute storage unit
136 Avoidance information acquisition unit
137 Learning unit
201 Client terminal
211 Controller
221 Sensor data transmitter
222 Event presentation unit

The invention claimed is:

1. An information processing device, comprising an information processor configured to:

generate an event based on a context of a first user, wherein the event is a fictitious event, the event causes a change in a distance between the first user and a second user that the first user has encountered and the context is associated with a biological reaction of the first user with respect to the second user; and control presentation of the event to the first user, wherein the information processor is further configured to generate a plurality of events, wherein details associated with each event of the plurality of events is different, and the details associated with the each event of the plurality of events are based on whether the second user is an acquaintance of the first user or a stranger to the first user.

2. The information processing device according to claim 1, wherein the information processor is further configured to control display of the event to the first user and the second user.

3. The information processing device according to claim 1, wherein in a case where the second user is the acquaintance of the first user, the information processor is further configured to Generate a first fictitious event that differs from a second fictitious event, wherein the second fictitious event has been generated for the second user in past, and details of the first fictitious event are different from details of the second fictitious event.

4. The information processing device according to claim 1, wherein the information processor is further configured to: receive registration information of one or more users from the first user, wherein the one or more users include the second user; determine the second user as the acquaintance of the first user in a case where information of the second user is included in the received registration information; determine a third user of the one or more users as the stranger to the first user in a case where information of the third user is different from the received registration information; and generate a first fictitious event for the second user determined as the acquaintance of the first user.

5. The information processing device according to claim 1, wherein the details associated with the each event of the plurality of events are based on an avoidance level, and the avoidance level indicates a degree of desire of the first user to change the distance between the first user and the second user.

6. The information processing device according to claim 5, wherein the details associated with the each event of the plurality of events are based on the avoidance level designated by the first user.

7. The information processing device according to claim 1, wherein the information processor is further configured to receive sensor data from a device associated with the first user, the information processing device further comprises a context detector configured to detect the context based on the received sensor data, and the information processor is further configured to:

detect an utterance of a specific word by the first user, wherein the specific word triggers the event; and generate the event in a case where the context indicates that the first user has uttered the specific word that triggers the event.

8. The information processing device according to claim 1, wherein the information processor is further configured to generate the event to increase the distance between the first user and the second user.

9. The information processing device according to claim 8, wherein in a case where the first user and the second user are predicted to come into contact with each other, the information processor is further configured to generate the event to guide the first user along a traveling direction, and the traveling direction is corresponds to a direction away from the second user.

10. The information processing device according to claim 9, wherein the information processor is further configured to:

control presentation of the prediction that the first user and the second user are predicted to come into contact with each other; and generate the event based on an instruction from the first user to increase the distance between the first user and the second user.

11. The information processing device according to claim 8, wherein the information processor is further configured to:

control a device associated with the first user to output a voice, wherein the voice notifies details of the event to the first user.

12. The information processing device according to claim 8, wherein in a case where the first user and the second user are in contact with each other, the information processor is further configured to:

determine a change in the context of the first user to a state where the first user desires to increase the distance between the first user and the second user; and generate the event to increase the distance between the first user and the second user based on the change in the context of the first user.

13. The information processing device according to claim 12, wherein the information processor is further configured to:

generate, as the event, a situation in which a third user calls the first user; and control a device associated with the first user to output information that indicates details of how to call the third user.

14. The information processing device according to claim 12, wherein the information processor is further configured to:

generate, as the event, things to do for the first user; and control a device associated with the first user to output information that indicates details of the things to do.

15. An information processing method implemented by an information processing device, the method comprising:

generating an event based on a context of a first user, wherein the event is a fictitious event, the event causes a change into change a distance between the first user and a second user that the first user has encountered, the context is associated with a biological reaction of the first user with respect to the second user; and controlling presentation of the event to the first user, wherein the method is further comprising generating a plurality of events, wherein details associated with each event of the plurality of events is different, and the details associated with the each event of the plurality of events are based on whether the second user is an acquaintance of the first user or a stranger to the first user.

16. A non-transitory computer readable medium having stored thereon computer-executable instructions which, when executed by a computer, cause the computer to execute operations, the operations comprising:

generating an event based on a context of a first user, wherein the event is a fictitious event, the event causes a change in a distance between the first user and a second user that the first user has encountered, and the context is associated with a biological reaction of the first user with respect to the second user; and controlling presentation of the event to the first user, wherein the operations are further comprising generating a plurality of events, wherein details associated with each event of the plurality of events is different, and the details associated with the each event of the plurality of events are based on whether the second user is an acquaintance of the first user or a stranger to the first user.

17. An information processing system, comprising: an information processing device comprising an information processor; and an information processing terminal comprising an output unit, wherein the information processor is configured to:

generate an event based on a context of a first user, wherein the event is a fictitious event, the event causes a change in a distance between the first user and a second user that the first user has encountered and the context is associated with a biological reaction of the first user with respect to the second user; and control the output unit of the information processing terminal to present the event to the first user, and the output unit is configured to present the event to the first user based on the control of the information processor, wherein the information processor is further configured to generate a plurality of events, wherein details associated with each event of the plurality of events is different, and the details associated with the each event of the plurality of events are based on whether the second user is an acquaintance of the first user or a stranger to the first user.

* * * * *